(12) United States Patent  
Amundson

(10) Patent No.: US 11,441,727 B1  
(45) Date of Patent: Sep. 13, 2022

(54) MOBILE DEVICE SUPPORT SYSTEM

(71) Applicant: Peter Amundson, Fargo, ND (US)

(72) Inventor: Peter Amundson, Fargo, ND (US)

( * ) Notice: Subject to any disclaimer, the term of this patent is extended or adjusted under 35 U.S.C. 154(b) by 0 days.

(21) Appl. No.: 17/656,382

(22) Filed: Mar. 24, 2022

(51) Int. Cl.
| | |
|---|---|
| *H02J 7/00* | (2006.01) |
| *F16M 11/20* | (2006.01) |
| *F16M 11/38* | (2006.01) |
| *H04M 1/04* | (2006.01) |
| *H02J 50/10* | (2016.01) |

(52) U.S. Cl.
CPC ......... *F16M 11/2021* (2013.01); *F16M 11/38* (2013.01); *H02J 7/0042* (2013.01); *H04M 1/04* (2013.01); *H02J 50/10* (2016.02)

(58) Field of Classification Search
CPC ....................................................... H02J 7/00
See application file for complete search history.

(56) References Cited

U.S. PATENT DOCUMENTS

| | | | |
|---|---|---|---|
| 8,638,557 B2 | 1/2014 | Tsai | |
| 9,059,592 B2 | 6/2015 | Fan | |
| 9,397,718 B2 | 7/2016 | Lachnitt | |
| 10,491,727 B1 | 11/2019 | Liu | |
| 10,711,812 B2 | 7/2020 | Liu | |
| 10,836,326 B1 | 11/2020 | Yang | |
| 10,948,001 B2 | 3/2021 | Yang | |
| 2012/0318950 A1 | 12/2012 | Wilber | |
| 2015/0330437 A1* | 11/2015 | Clouser | F16B 47/00 248/206.3 |
| 2019/0217788 A1 | 7/2019 | Buchhalter | |
| 2020/0389038 A1 | 12/2020 | Zeng | |

* cited by examiner

*Primary Examiner* — Robert Grant
(74) *Attorney, Agent, or Firm* — Inskeep IP Group, Inc.

(57) ABSTRACT

A support stand for mobile devices which may be arranged in multiple configurations to support different devices in different orientations, and which may support a wireless charger. An exemplary embodiment may include a support member for supporting a mobile device which is pivotably connected to a base. One or more arms may be removably connected to the support member. The arms may each be connectable to the support member in a first position in which the arms are parallel to the support member and a second position in which the arms are not parallel (e.g., perpendicular) to the support member. The arms may be interchangeably connected in different positions to support a wide range of mobile devices. A wireless charger may be secured to the support member such that the mobile device may rest upon the wireless charger when supported by the support member.

26 Claims, 18 Drawing Sheets

MOBILE DEVICE SUPPORT SYSTEM

FIELD OF THE INVENTION

The described example embodiments in general relate to a support stand for mobile devices which may be arranged in multiple configurations to support different devices in different orientations, and which may support a standard wireless charger.

BACKGROUND OF THE INVENTION

Mobile devices have become ubiquitous in modern life. Whether at home, in a restaurant, in a gym, or elsewhere, it has become increasingly popular for individuals to view their mobile devices in an effort to stay connected and engaged. However, most mobile devices do not include their own stands, and thus need to be either propped up on another object or held in one's hand in order for the screen to be viewable in many circumstances and situations.

Additionally, an increasing number of mobile devices such as tablets, phones, and calculators now include the wireless charging capabilities, in which the mobile device may be positioned adjacent to a wireless charger to charge an internal battery using inductance. Such wireless chargers are commonly sold as round "pads" on which the mobile device may be positioned for wireless charging. However, the round nature of these pads often makes the positioning and orientation of the mobile device awkward when charging.

While support stands are widely available for propping up mobile devices (e.g., while eating), such support stands are typically of limited versatility. Thus, different support stands may be needed for different types of mobile devices owned by the same person. Additionally, the available orientations of such previous support stands are often limited. It would be hugely beneficial to use a support stand for a mobile device that is capable of supporting a wide range of different mobile devices, is adjustable into different orientations, and is capable of supporting a wireless charging pad so as to charge the mobile device as it is being supported.

SUMMARY OF THE INVENTION

Some of the various embodiments of the present disclosure relate to a support stand for mobile devices which may be arranged in multiple configurations to support different devices in different orientations, and which may support a wireless charger. An exemplary embodiment may include a support member for supporting a mobile device which is pivotably connected to a base. One or more arms may be removably connected to the support member. The arms may each be connectable to the support member in a first position in which the arms are parallel to the support member and a second position in which the arms are not parallel (e.g., perpendicular) to the support member. The arms may be interchangeably connected in different positions to support a wide range of mobile devices. A wireless charger may be removably secured to the support member such that the mobile device may rest upon the wireless charger when supported by the support member.

There has thus been outlined, rather broadly, some of the embodiments of the present disclosure in order that the detailed description thereof may be better understood, and in order that the present contribution to the art may be better appreciated. There are additional embodiments of that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION

Figure 1:
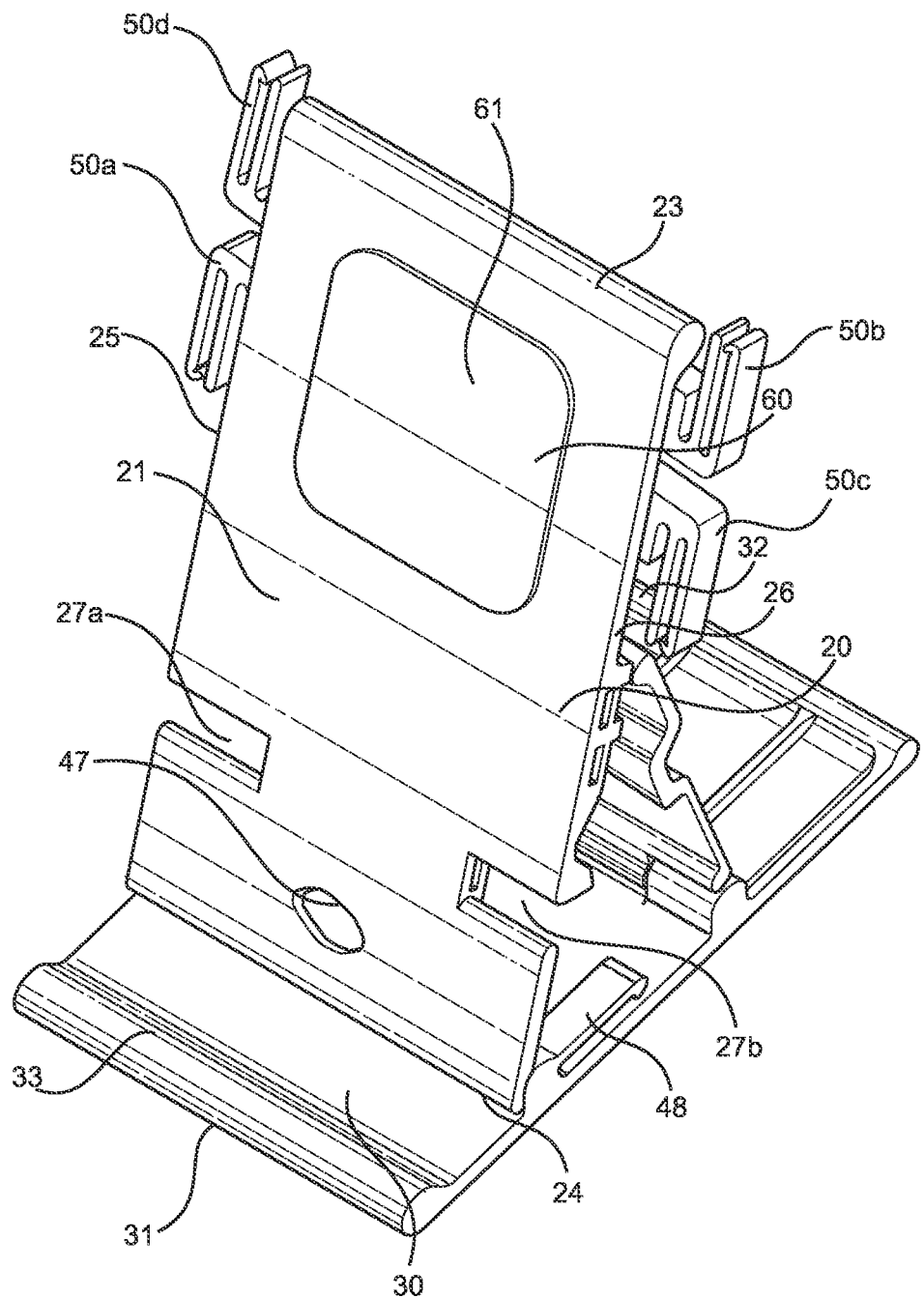
FIG. 1 is a perspective view of a mobile device support system with arms in a parallel position in accordance with an example embodiment.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Some of the various embodiments of the present disclosure relate to a mobile device support system including a support member 20 that can support a mobile device 80 in various orientations and positions. Some of the various embodiments of the present disclosure include a wireless charger 70 that may be removably connected to the support member 20 for wirelessly charging any mobile device 80 supported by the support member 20. One or more arms 50a, 50b, 50c, 50d may be removably connected to the support member 20 in various positions and orientations for supporting the mobile device 80 thereon. The support member 20 may be pivoted into different angles of incline with respect to a base 30 so as to adjust the angle of incline of the supported mobile device 80. The support member 20 may also be folded or collapsed onto the base 30 to allow for easy storage or transport.

An exemplary embodiment of the mobile device support system may include a base 30 and a support member 20 pivotably connected to the base 30, with the support member 20 being adapted for supporting a mobile device 80. A plurality of arms 50a, 50b, 50c, 50d may be removably connected to the support member 20, with each of the plurality of arms 50a, 50b, 50c, 50d being connectable to the support member 20 in a first position and a second position. In the first position, each of the plurality of arms 50a, 50b, 50c, 50d is parallel to the support member 20. In the second position, each of the plurality of arms 50a, 50b, 50c, 50d is not parallel to the support member 20.

The support member 20 may include a plurality of first connectors 40a, 40b, 40c, 40d and a plurality of second connectors 42a, 42b, 42c, 42d. Each of the plurality of arms 50a, 50b, 50c, 50d may be adapted to be connected to one of the plurality of first connectors 40a, 40b, 40c, 40d in the first position, or be connected to one of the plurality of second connectors 42a, 42b, 42c, 42d in the second position. Each of the plurality of arms 50a, 50b, 50c, 50d may be comprised of an opening 53 and/or an outer indentation 54 for engaging with one of the plurality of first connectors 40a, 40b, 40c, 40d. Each of the plurality of arms 50a, 50b, 50c, 50d may also be comprised of a hook 57 for engaging with one of the plurality of second connectors 42a, 42b, 42c, 42d.

Each of the plurality of first connectors 40a, 40b, 40c, 40d may be comprised of a projection and each of the plurality of second connectors 42a, 42b, 42c, 42d may be comprised of an opening such as a socket 43. The plurality of second connectors 42a, 42b, 42c, 42d may be comprised of a first pair of second connectors 42a, 42c and a second pair of second connectors 42b, 42d, with the second pair of second connectors 42b, 42d being spaced closer together than the first pair of second connectors 42a, 42c.

The first position of each of the plurality of arms 50a, 50b, 50c, 50d may be positioned on an upper half of the support member 20 and a second position of each of the plurality of arms 50a, 50b, 50c, 50d may be positioned on a lower half of the support member 20. In the second position, each of the plurality of arms 50a, 50b, 50c, 50d may be perpendicular to the support member 20. Each of the arms 50a, 50b, 50c, 50d may comprise an L-shaped member including a first portion 51 and a second portion 52, with the first and second portions 51, 52 being perpendicular to each other.

The support member 20 may be adjustable between a third position and a fourth position with respect to the base 30. In the third position, the support member 20 may be parallel to the base 30. In the fourth position, the support member 20 may not be parallel to the base 30. By way of example and without limitation, the support member 20 may be at between a 25 degree and a ninety degree angle with respect to the base 30 when in the fourth position.

The base 30 may include a front lip 33 for supporting the mobile device 80. A wireless charger 70 may be adapted to be removably connected to the support member 20. The support member 20 may include an opening 47 through which a cord 72 of the wireless charger 70 may extend. A charger mount 60 may be removably connected to the support member 20, with the wireless charger 70 being adapted to be removably or permanently connected to the charger mount 60.

As best shown in FIGS. 1-10 and 12-16, the mobile device support system generally includes a support member 20 adapted to support a mobile device 80. The support member 20 is adjustable between a horizontal position for easy transport and storage and an upright (e.g., vertical, diagonal) position such that the mobile device 80 is easier to view without the need for propping the mobile device 80 up or holding the mobile device 80.

The shape, size, and configuration of the support member 20 may vary in different embodiments. The exemplary embodiment shown in FIGS. 1-10 illustrates a support member 20 having a substantially rectangular shape. However, in certain embodiments, different shapes may be utilized so long as a mobile device 80 may be adequately supported.

Figure 9:
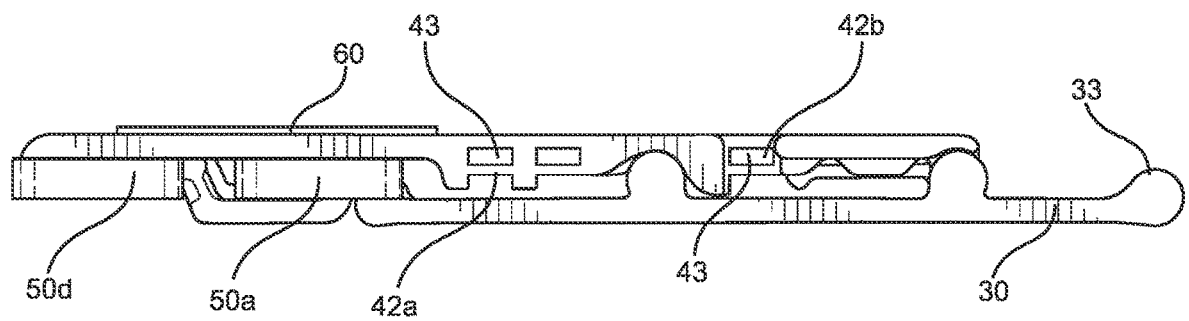
FIG. 9 is a first side view of a mobile device support system in a collapsed state in accordance with an example embodiment.
Figure 10:
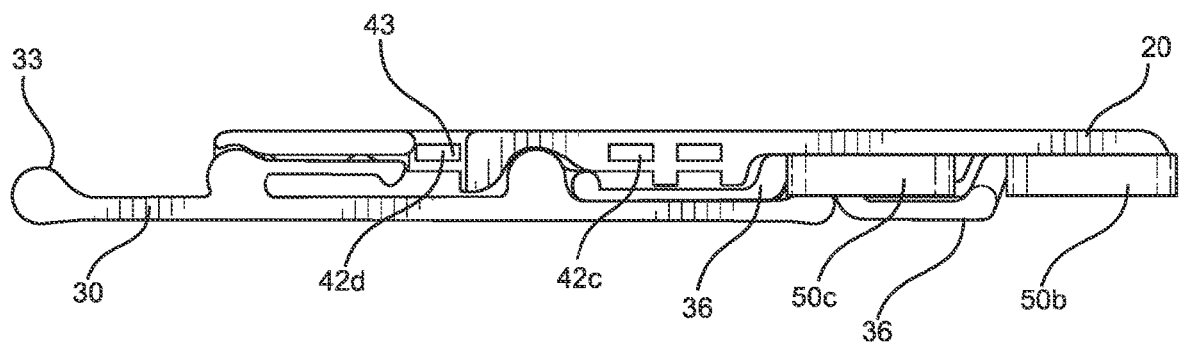
FIG. 10 is a second side view of a mobile device support system in a collapsed state in accordance with an example embodiment.

As best shown in FIGS. 1-4B, the support member 20 may be pivotably (i.e., hingedly) connected to a base 30 such that the orientation and position of the support member 20 may be adjusted. FIGS. 9 and 10 illustrate the support member 20 in a folded, collapsed position in which the support member 20 is parallel to and rests against the base 30. Such a position is useful for storage or transport. FIG. 1 illustrates the support member 20 in an upright, extended position in which the support member 20 extends upwardly at an angle from the base 30. Such a position is useful for usage.

The support member 20 may be positioned perpendicular to the base 30 so as to support the mobile device 80 in a vertical position. In FIG. 1, it can be seen that the support member 20 is at a non-perpendicular angle to the base (e.g., 30 degrees, 45 degrees, 60 degrees, etc.) so as to support the mobile device 80 in a diagonal upright position.

In the figures, it can be seen that an exemplary embodiment of a support member 20 may comprise an outer surface 21, an inner surface 22, an upper end 23, a lower end 24, a first side 25, and a second side 26. The outer surface 21 of the support member 20 will generally face towards the user, with the mobile device 80 being supported thereon when in use. The inner surface 22 of the support member 20 will generally face towards the base 30. The lower end 24 of the support member 20 is positioned against the base 30 when the support member 20 is in the extended position such as shown in FIG. 1.

As shown in FIGS. 1-10, one or more arms 50a, 50b, 50c, 50d may be selectively, removably, and adjustably connectable to one or both sides 25, 26 of the support member 20. The arms 50a, 50b, 50c, 50d may be connected to the sides 25, 26 of the support member 20 so as to support a mobile device 80 without the mobile device 80 wobbling and to prevent the mobile device 80 from slipping off the sides 25, 26 of the support member 20 when being supported.

As shown throughout the figures and discussed in more detail below, the arms 50a, 50b, 50c, 50d may be connected to the support member 20 in multiple positions, including a first position in which the arms 50a, 50b, 50c, 50d are parallel to the support member 20 and a second position in which the arms 50a, 50b, 50c, 50d are not parallel (e.g., perpendicular) to the support member 20. The arms 50a, 50b, 50c, 50d may also be interchangeably connected to positions near the upper end 23 of the support member 20 and positions near the lower end 24 of the support member 20.

Figure 2A:
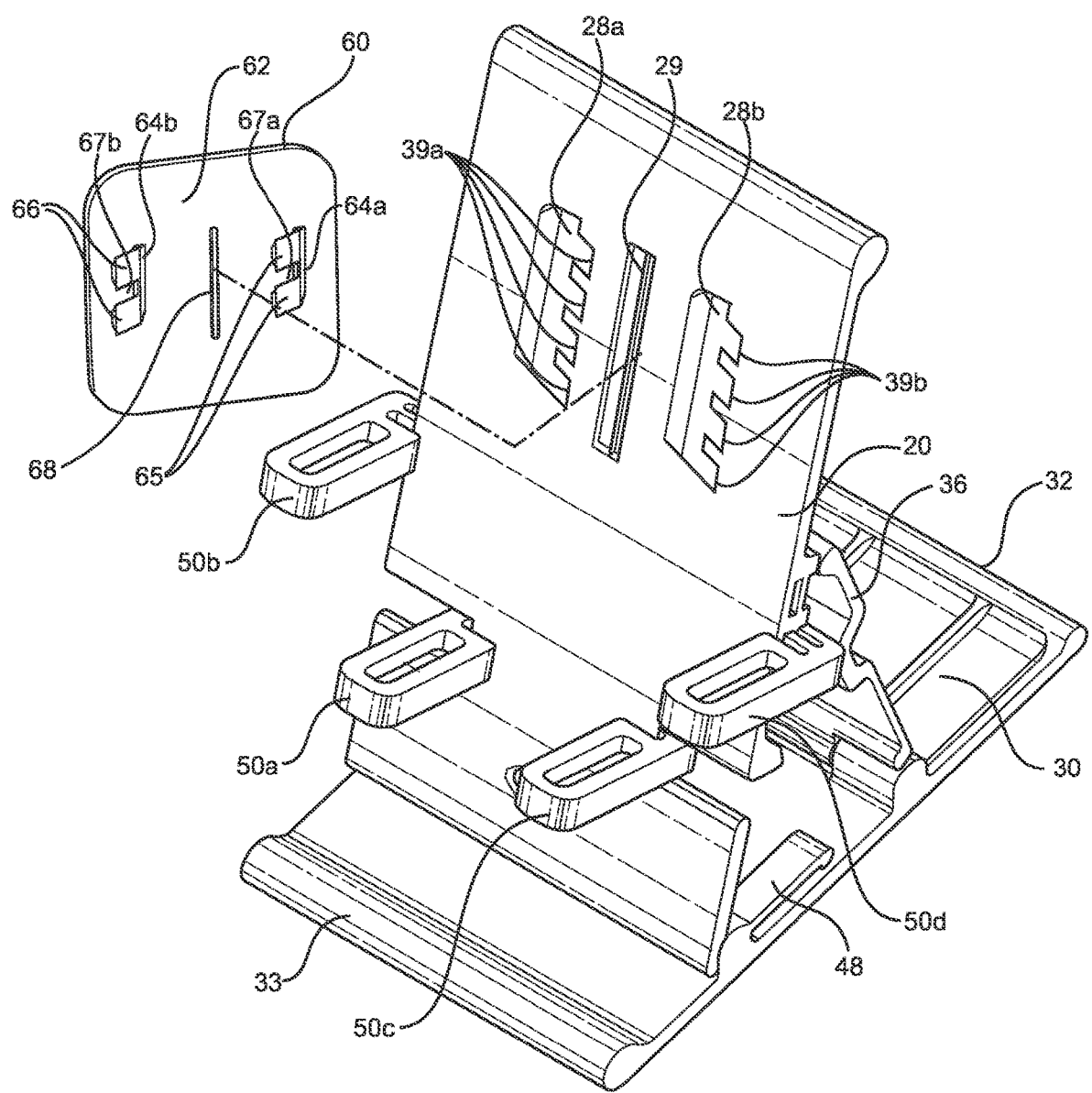
FIG. 2A is a perspective view of a mobile device support system with arms in a perpendicular position and illustrating a disconnected charger mount in accordance with an example embodiment.
Figure 2B:
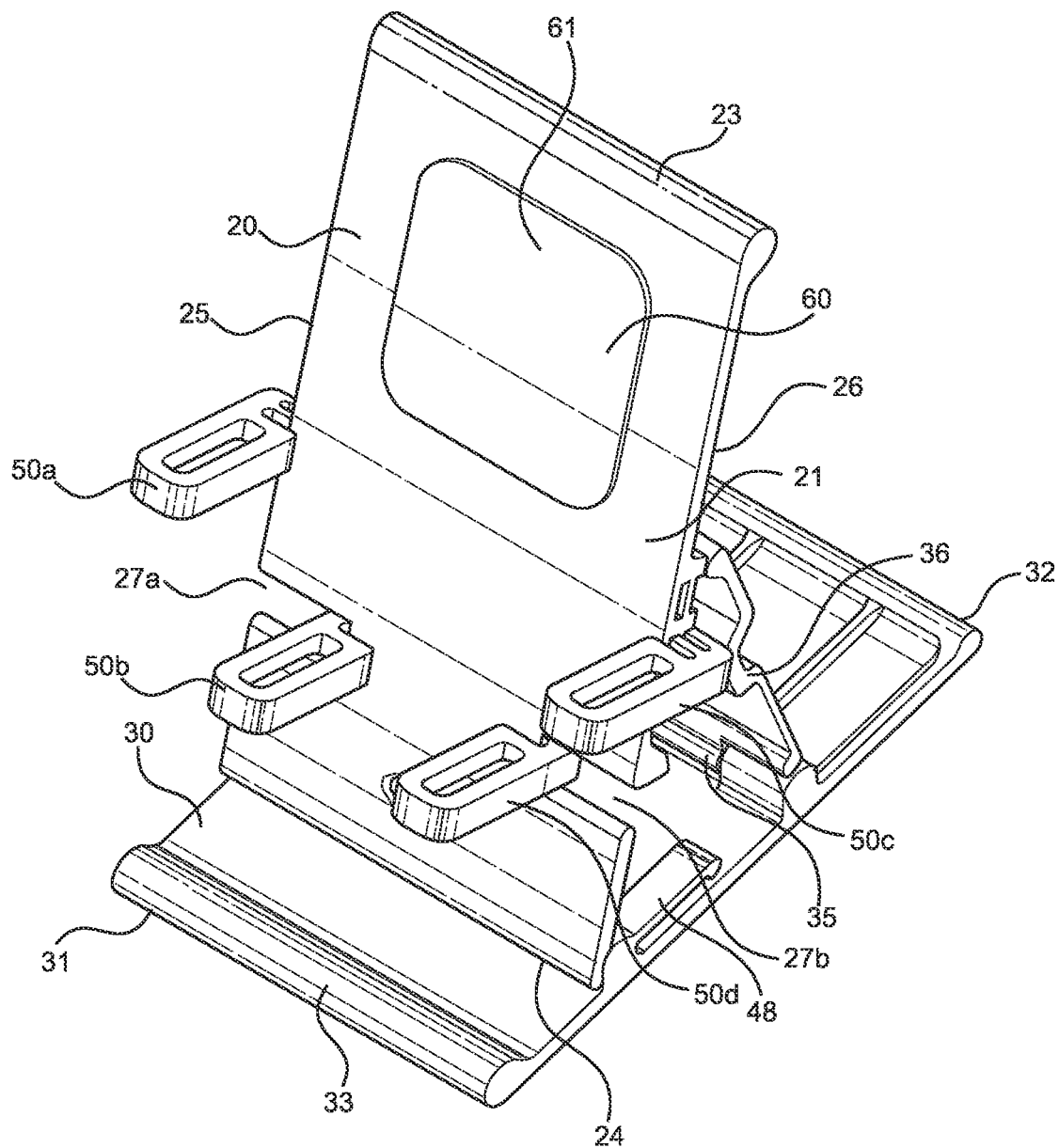
FIG. 2B is a perspective view of a mobile device support system with arms in a perpendicular position and illustrating a connected charger mount in accordance with an example embodiment.
Figure 4A:
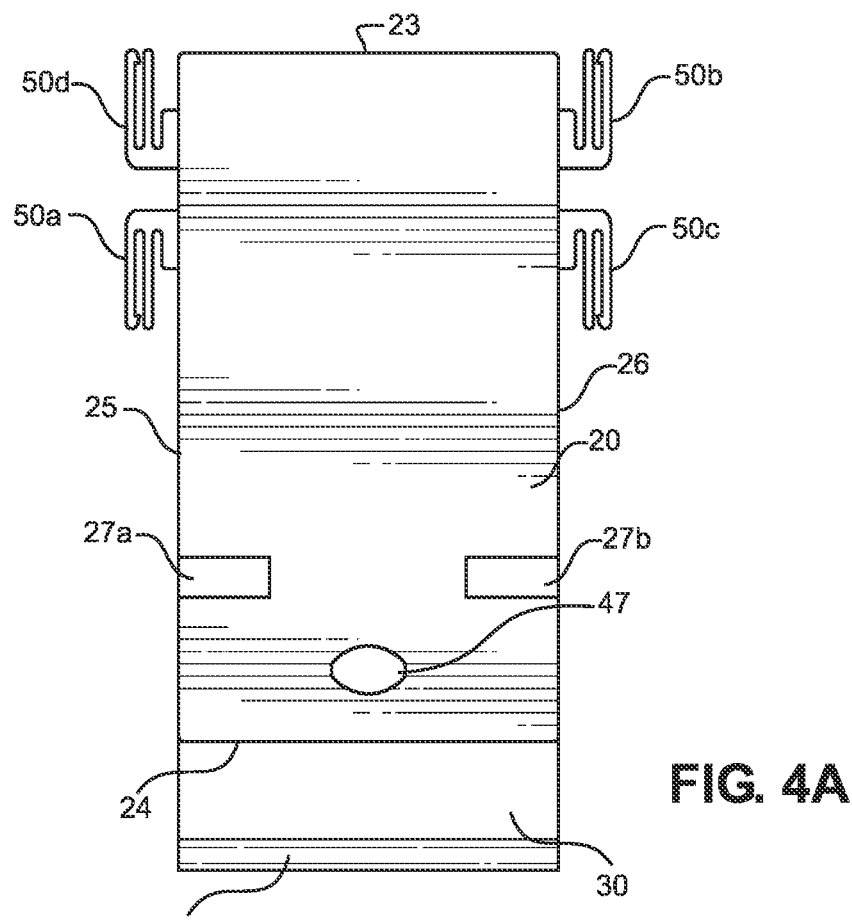
FIG. 4A is a front view of a mobile device support system with arms in a parallel position in accordance with an example embodiment.

As best shown in FIGS. 2A and 2B, a charger mount 60 may be removably and adjustably connected to the outer surface 21 of the support member 20 to which a wireless charger 70 may be removably secured. The outer surface 21 of the support member 20 may include one or more receivers 28a, 28b to which a charger mount 60 may be adjustably and removably connected. However, in some embodiments such as shown in FIGS. 4A and 10, the outer surface 21 of the support member 20 may omit such receivers 28a, 28b, instead including only a flat surface to support the mobile device 80.

Continuing to reference FIG. 2A, it can be seen that a first receiver 28a may be positioned near a first side 25 of the support member 20 and a second receiver 28b may be positioned near a second side 26 of the support member 20. Each of the receivers 28a, 28b may comprise a plurality of projections defining a plurality of slots 39a, 39b adapted to selectively engage with corresponding projections 65, 66 and slots 67a, 67b on the charger mount 60 as discussed in more detail herein. A central groove 29 may be positioned between the receivers 28a, 28b which is adapted to engage with a corresponding elongated projection 68 on the charger mount 60 as discussed in more detail herein.

The receivers 28a, 28b may be utilized to removably secure a charger mount 60 to the outer surface 21 of the support member 20 in different positions. As discussed in more detail below, the charger mount 60 may be removably connected to the support member 20 through use of the receivers 28a, 28b, with the receivers 28a, 28b including slots 39a, 39b which allow the charger mount 60 to be adjusted between various positions along the outer surface 21 of the support member 20 to support different types of wireless chargers 70 and/or mobile devices 80.

As best shown in FIG. 2A, the projections 65, 66 on the inner surface 62 of the charger mount 60 may be selectively engaged within corresponding slots 39a, 39b in the receivers 28a, 28b on the outer surface 21 of the support member 20. It can be seen that the first receiver 28a may include a first plurality of slots 39a and that the second receiver 28b may include a second plurality of slots 39b. In the figures, the first receiver 28a is shown as including four slots 39a and the second receiver 28b is shown as including four slots 39b. It should be appreciated that more or less slots 39a, 39b may be utilized in different embodiments, and thus the exemplary embodiment shown in the figures should not be construed as limiting in scope.

Continuing to reference FIG. 2A, it can be seen that the charger mount 60 may include a first pair of projections 65 and a second pair of projections 66. The first pair of projections 65 may be selectively engaged within a pair of the first slots 39a of the support member 20, and the second pair of projections 66 may be selectively engaged within a pair of the second slots 39b of the support member 20 to removably secure the charger mount 60 to the support member 20.

By selecting which of the slots 39a, 39b in which to engage the projections 65, 66, the height of the charger mount 60 along the outer surface 21 of the support member 20 may be adjusted such that the wireless charger 70 is ensured to be positioned at the proper location for efficient charging of any mobile device 80 positioned on the support member 20. The central groove 29 of the support member 20 may thus be longer than the corresponding elongated projection 68 of the charger mount 60 so as to accommodate different positions of the charger mount 60.

Figure 4B:
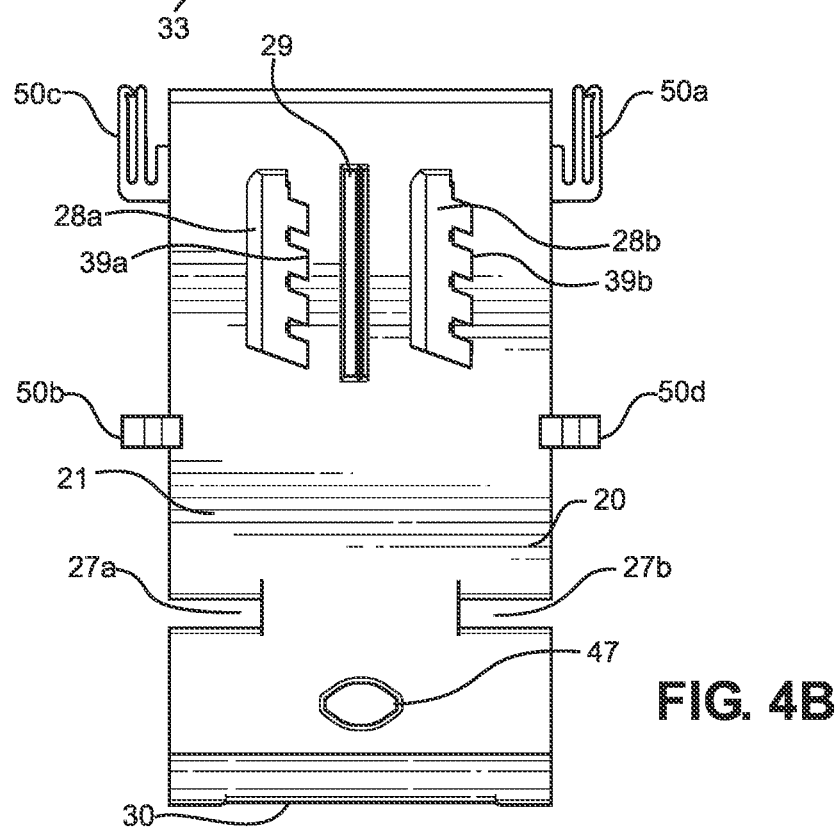
FIG. 4B is a front view of a mobile device support system in an upright orientation with two arms in a parallel position and two arms in a perpendicular position in accordance with an example embodiment.
Figure 5:
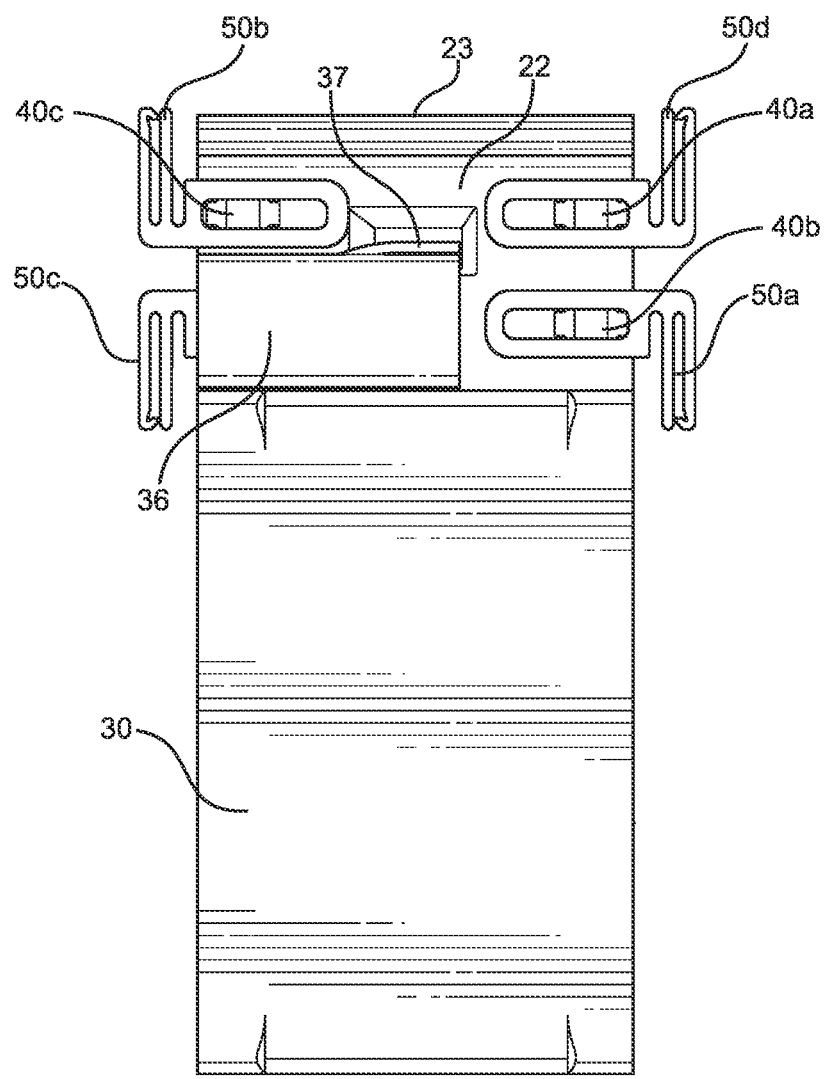
FIG. 5 is a rear view of a mobile device support system with arms in a parallel position in accordance with an example embodiment.
Figure 12:
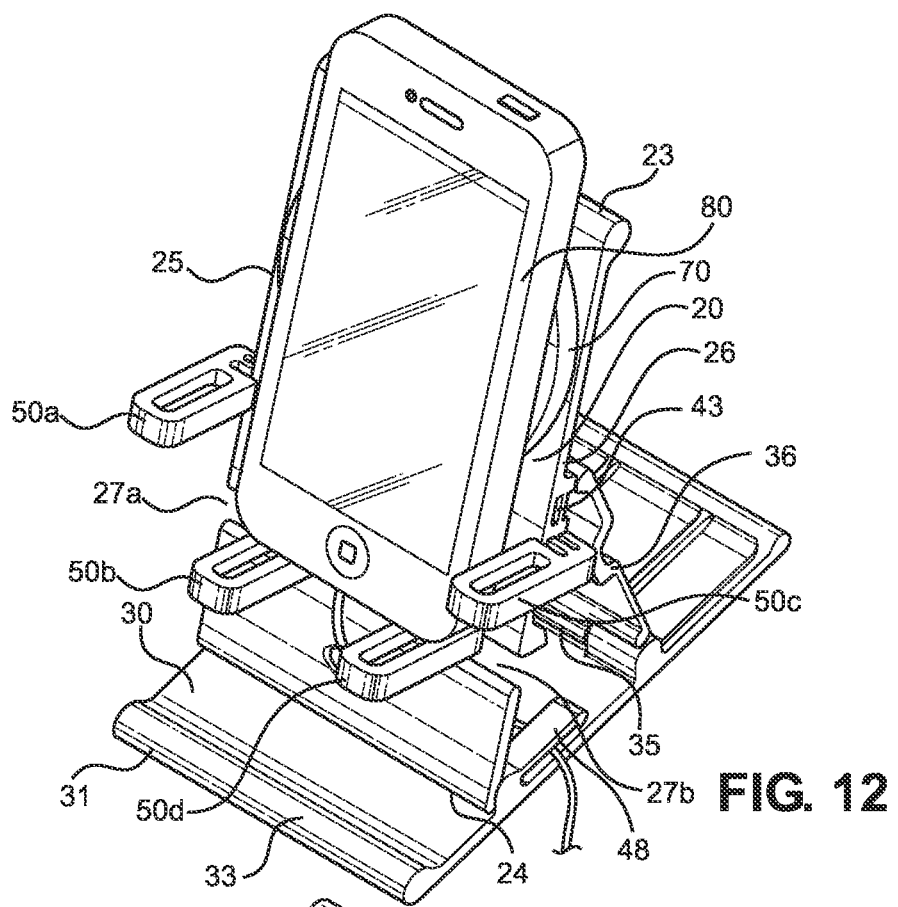
FIG. 12 is a perspective view of a mobile device support system in use supporting a mobile device comprised of a mobile phone in a vertical orientation in accordance with an example embodiment.

As best shown in FIGS. 4A and 4B, the support member 20 may include a pair of slots 27a, 27b on its first and second sides 25, 26. The slots 27a, 27b may be utilized to accommodate arms 50a, 50b, 50c, 50d, with the slots 27a, 27b allowing such arms 50a, 50b, 50c, 50d to be positioned closer together so as to support a mobile device 80 such as shown in FIG. 12. In the figures, it can be seen that a first slot 27a is positioned on the first side 25 of the support member 20 near its lower end 24 and that a second slot 27b is positioned on the second side 26 of the support member 20 near its lower end 24. It should be appreciated that the positioning of the slots 27a, 27b may vary in different embodiments, and thus should not be construed as limited by the exemplary embodiments shown in the figures.

The arms 50a, 50b, 50c, 50d may be selectively and removably inserted within the slots 27a, 27b to engage with second connectors 42b, 42d to secure the arms 50a, 50b, 50c, 50d in a perpendicular position close to each other so as to support the bottom of a mobile device 80 such as shown in FIG. 12. It should be appreciated that the depth of the slots 27a, 27b may vary in different embodiments and thus should not be construed as limiting in scope.

Figure 6A:
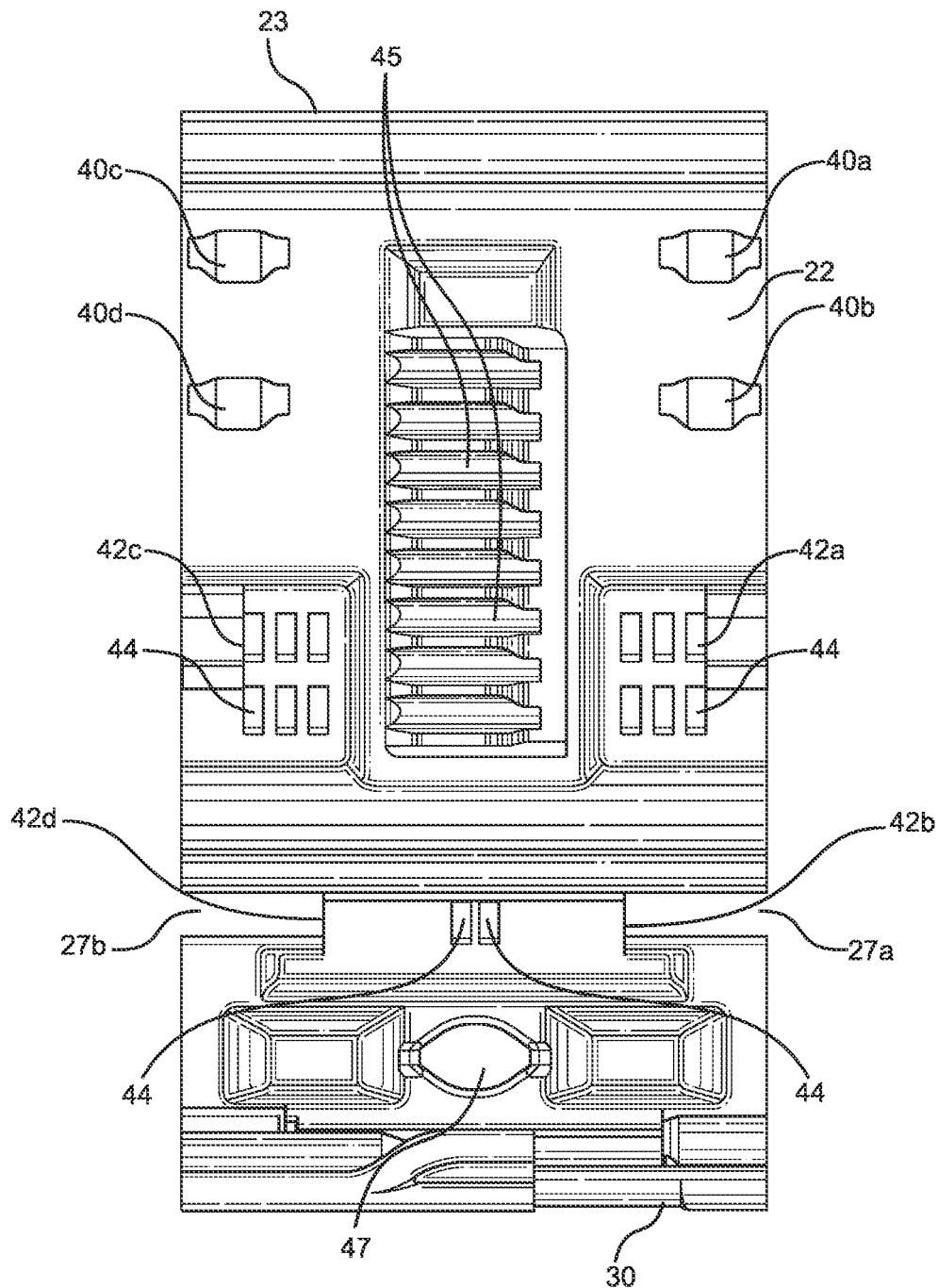
FIG. 6A is a rear view of a mobile device support system with the support member pivoted away from the base in accordance with an example embodiment.
Figure 6B:
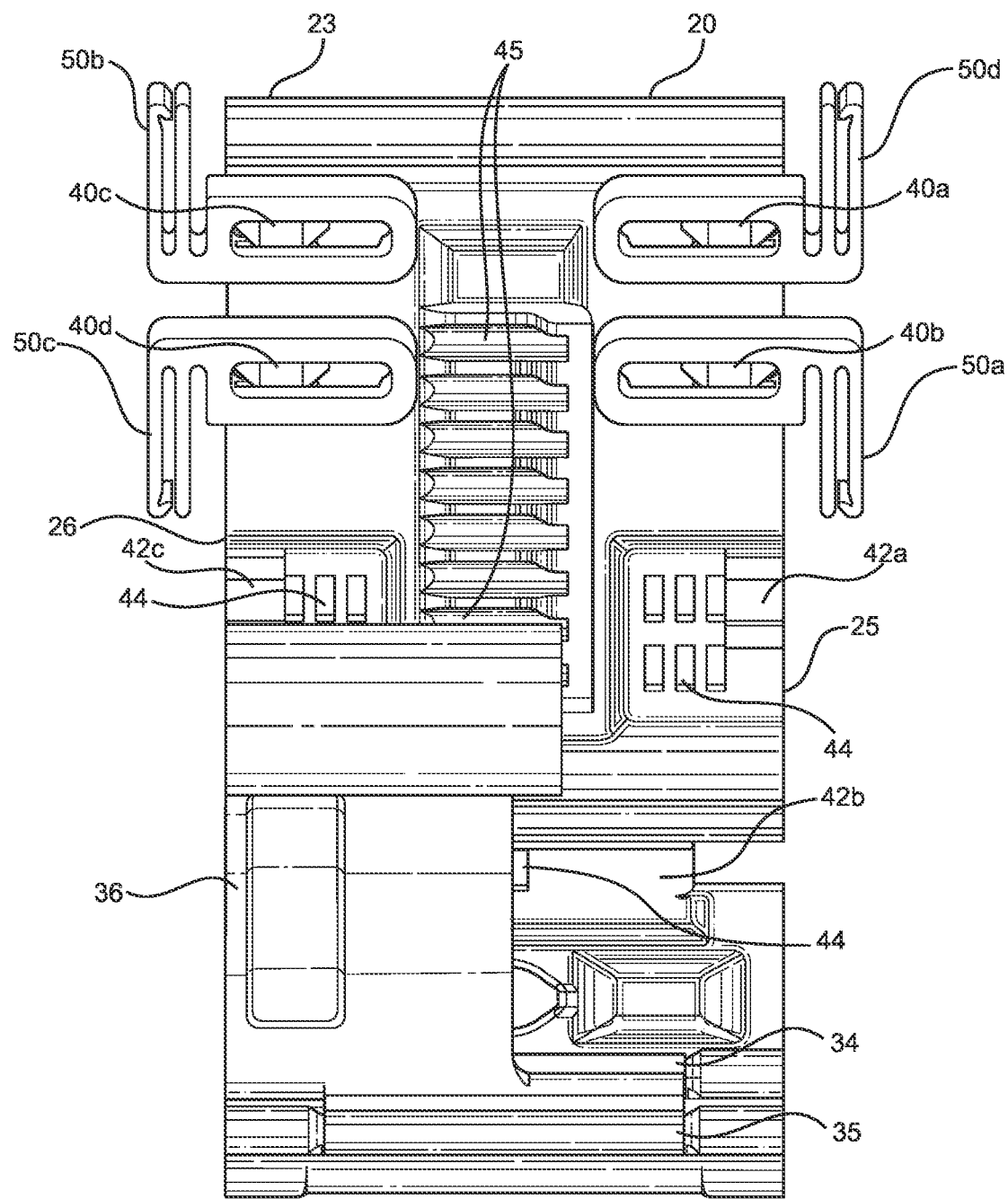
FIG. 6B is a rear view of a mobile device support system in a diagonal upright orientation in accordance with an example embodiment.

FIGS. 6A and 6B best illustrate the inner surface 22 of the support member 20. As shown, the inner surface 22 of the support member 20 may include one or more first connectors 40a, 40b, 40c, 40d, one or more second connectors 42a, 42b, 42c, 42d, and a plurality of adjustment receivers 45. The first and second connectors 40a, 40b, 40c, 40d, 42a, 42b, 42c, 42d may be utilized to removably and adjustably connect one or more arms 50a, 50b, 50c, 50d to the support member 20 as discussed herein. The adjustment receivers 45 may be utilized to adjust the angle of the support member 20 with respect to the base 30 by adjusting which adjustment receiver 45 the adjustment member 36 connected between the base 30 and the support member 20 is connected to.

In the embodiment best shown in FIG. 6A, it can be seen that four first connectors 40a, 40b, 40c, 40d are positioned on the inner surface 22 of the support member 20 near its upper end 23 and that four second connectors 42a, 42b, 42c, 42d are positioned on the inner surface 22 of the support member 20 near its lower end 24. It should be appreciated that the number of first and/or second connectors 40a, 40b, 40c, 40d, 42a, 42b, 42c, 42d may vary in different embodiments. While the figures illustrate four first connectors 40a, 40b, 40c, 40d and four second connectors 42a, 42b, 42c, 42d, some embodiments may use more (e.g., six first and/or second connectors 40a, 40b, 40c, 40d, 42a, 42b, 42c, 42d) or less (e.g., two first and/or second connectors 40a, 40b, 42a, 42b) than is shown in the figures.

It should be appreciated that the arrangement, positioning, and orientation of the connectors 40a, 40b, 40c, 40d, 42a, 42b, 42c, 42d may vary in different embodiments. For example, the positioning of the respective first connectors 40a, 40b, 40c, 40d and second connectors 42a, 42b, 42c, 42d may be reversed in some embodiments, with the first connectors 40a, 40b, 40c, 40d being positioned near the lower end 24 of the support member 20 and the second connectors 42a, 42b, 42c, 42d being positioned near the upper end 23 of the support member 20.

As shown in the figures, the first connectors 40a, 40b, 40c, 40d may be utilized to removably connect one or more arms 50a, 50b, 50c, 50d in a first position which is parallel to the support member 20. As shown in FIGS. 6A and 6B, first connectors 40a, 40b may be positioned near a first side 25 of the support member 20 and first connectors 40c, 40d may be positioned near a second side 26 of the support member 20. Each of the first connectors 40a, 40b, 40c, 40d are illustrated as being positioned on an upper half of the support member 20. It should be appreciated that both the number of, and the positioning of, the first connectors 40a, 40b, 40c, 40d may vary in different embodiments and thus should not be construed as limited in scope by the exemplary embodiments shown in the figures.

Each of the first connectors 40a, 40b, 40c, 40d may comprise a projection on the inner surface 22 of the support member 20 to which each of the arms 50a, 50b, 50c, 50d may be removably connected. More specifically, each of the first connectors 40a, 40b, 40c, 40d may comprise a projection adapted to matingly engage with a corresponding opening 53 on each of the arms 50a, 50b, 50c, 50d. Thus, the arms 50a, 50b, 50c, 50d may "snap" onto a corresponding first connector 40a, 40b, 40c, 40d so as to connect the arms 50a, 50b, 50c, 50d to the support member 20 in the first position (i.e., parallel to the support member 20).

The shape, size, and positioning of the first connectors 40a, 40b, 40c, 40d may vary in different embodiments. As best shown in FIG. 6A, an exemplary embodiment may include a pair of first connectors 40a, 40b vertically aligned along the first side 25 of the support member 20 on its inner surface 22 and a pair of first connectors 40c, 40d vertically aligned along the second side 26 of the support member 20 on its inner surface 22.

More or less first connectors 40a, 40b, 40c, 40d may be utilized in different embodiments. For example, only a pair of first connectors 40a, 40c (or 40b, 40d) may be utilized in some embodiments. The respective pairs of first connectors 40a, 40b, 40c, 40d may not be vertically-aligned as shown in the figures in some embodiments. One or more of the first connectors 40a, 40b, 40c, 40d may be more inset from the respective sides 25, 26 of the support member 20 than shown in the figures.

Figure 15:
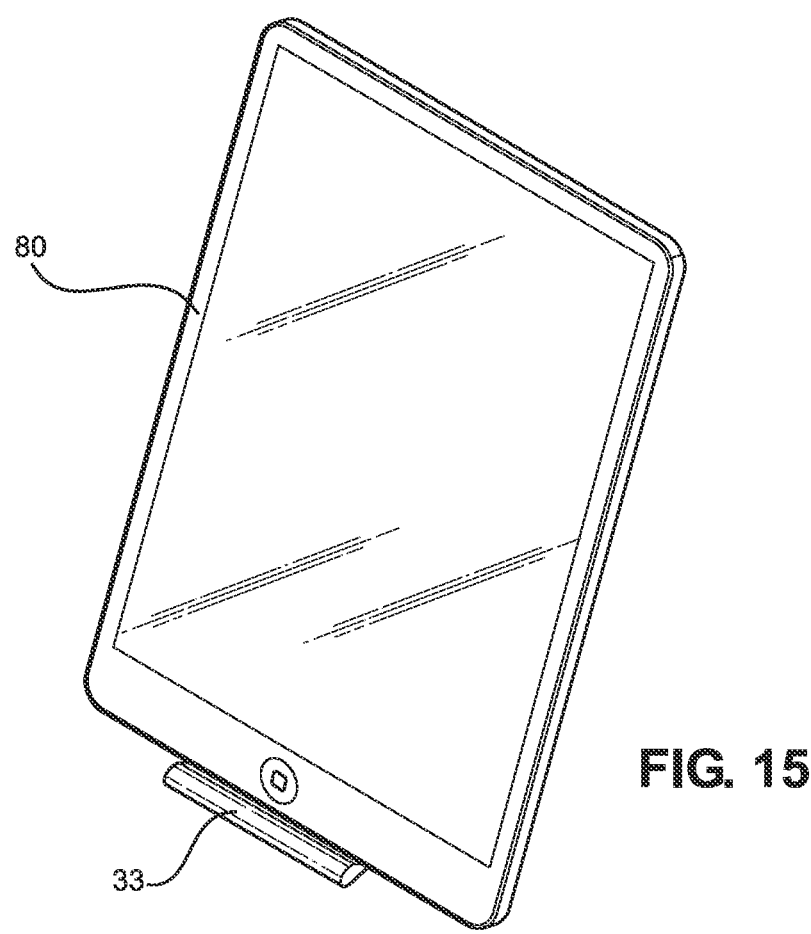
FIG. 15 is a perspective view of a mobile device support system in use supporting a mobile device comprised of a tablet in a vertical orientation in accordance with an example embodiment.
Figure 16:
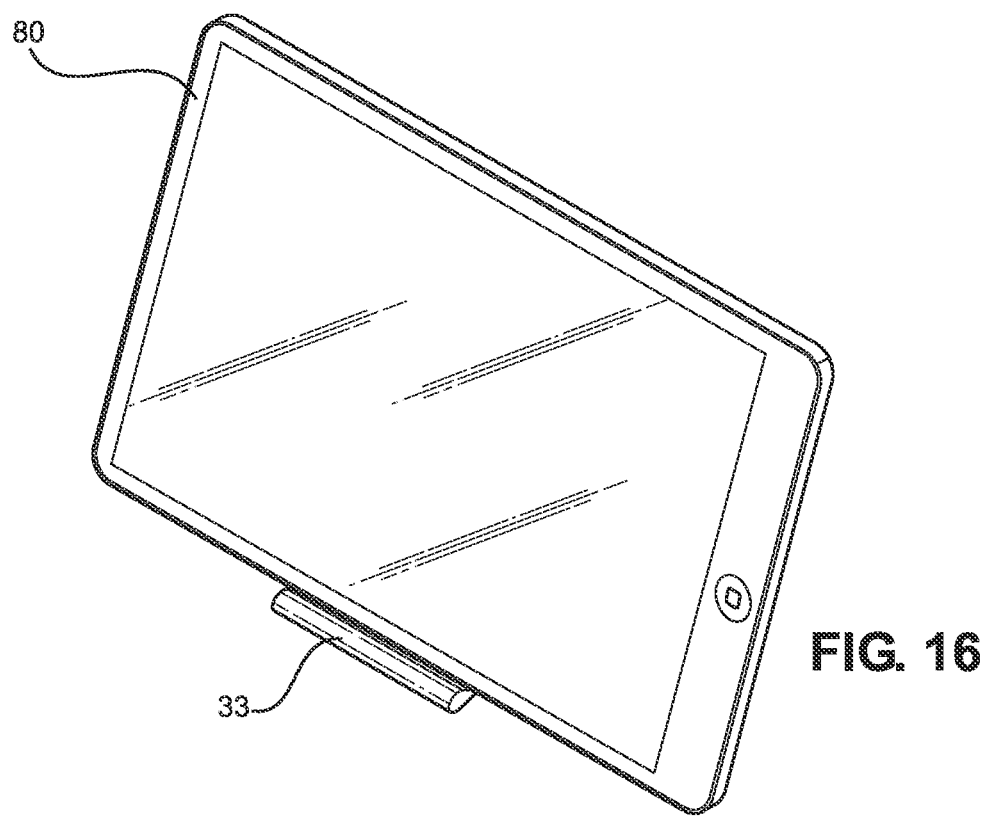
FIG. 16 is a perspective view of a mobile device support system in use supporting a mobile device comprised of a tablet in a horizontal orientation in accordance with an example embodiment.

When connected to the support member 20 in the first position by the first connectors 40a, 40b, 40c, 40d, the arms 50a, 50b, 50c, 50d may function to increase the effective width of the support member 20. This provides the benefit of accommodating wider mobile devices 80 without the risk of such wider mobile devices 80 tipping off the sides of the support member 20 or being wobbly. An exemplary embodiment showing a mobile device 80 being supported by arms 50a, 50b, 50c, 50d in the first position is shown in FIGS. 15 and 16.

As shown in the figures, the second connectors 42a, 42b, 42c, 42d may be utilized to removably connect one or more arms 50a, 50b, 50c, 50d in a second position which is not parallel (e.g., perpendicular) to the support member 20. As shown in FIGS. 6A and 6B, second connectors 42a, 42b may be positioned near a first side 25 of the support member 20 and second connectors 42c, 42d may be positioned near a second side 26 of the support member 20. Each of the second connectors 42a, 42b, 42c, 42d is illustrated as being positioned on a lower half of the support member 20. It should be appreciated that both the number of, and the positioning of, the second connectors 42a, 42b, 42c, 42d may vary in different embodiments and thus should not be construed as limited in scope by the exemplary embodiments shown in the figures.

Each of the second connectors 42a, 42b, 42c, 42d may comprise one or more sockets 43 extending into the body of the support member 20 or positioned on the inner surface 22 of the support member 20 into which each of the arms 50a, 50b, 50c, 50d may be removably inserted. More specifically, each of the second connectors 42a, 42b, 42c, 42d may comprise a socket 43 such as an opening or slot adapted to matingly engage with a corresponding elongated member 55 on each of the arms 50a, 50b, 50c, 50d. Thus, the arms 50a, 50b, 50c, 50d may be inserted into a corresponding second connector 42a, 42b, 42c, 42d to connect the arms 50a, 50b, 50c, 50d to the support member 20 in the second position.

As best shown in FIG. 6A, it can be seen that the first and third second connectors 42a, 42c may each include a pair of sockets 43, with each arm 50a, 50b, 50c, 50d being adapted to be selectively inserted into and engaged with one of the pair of sockets 43 to adjust the vertical positioning of the arms 50a, 50b, 50c, 50d as-needed to support different types of mobile devices 80. It should be appreciated that each of the second connectors 42a, 42b, 42c, 42d may comprise one socket 43 or multiple (e.g., two or more) sockets 43, and the configuration shown in the exemplary embodiment of FIG. 6A should not be construed as limiting in that regard.

Figure 7:
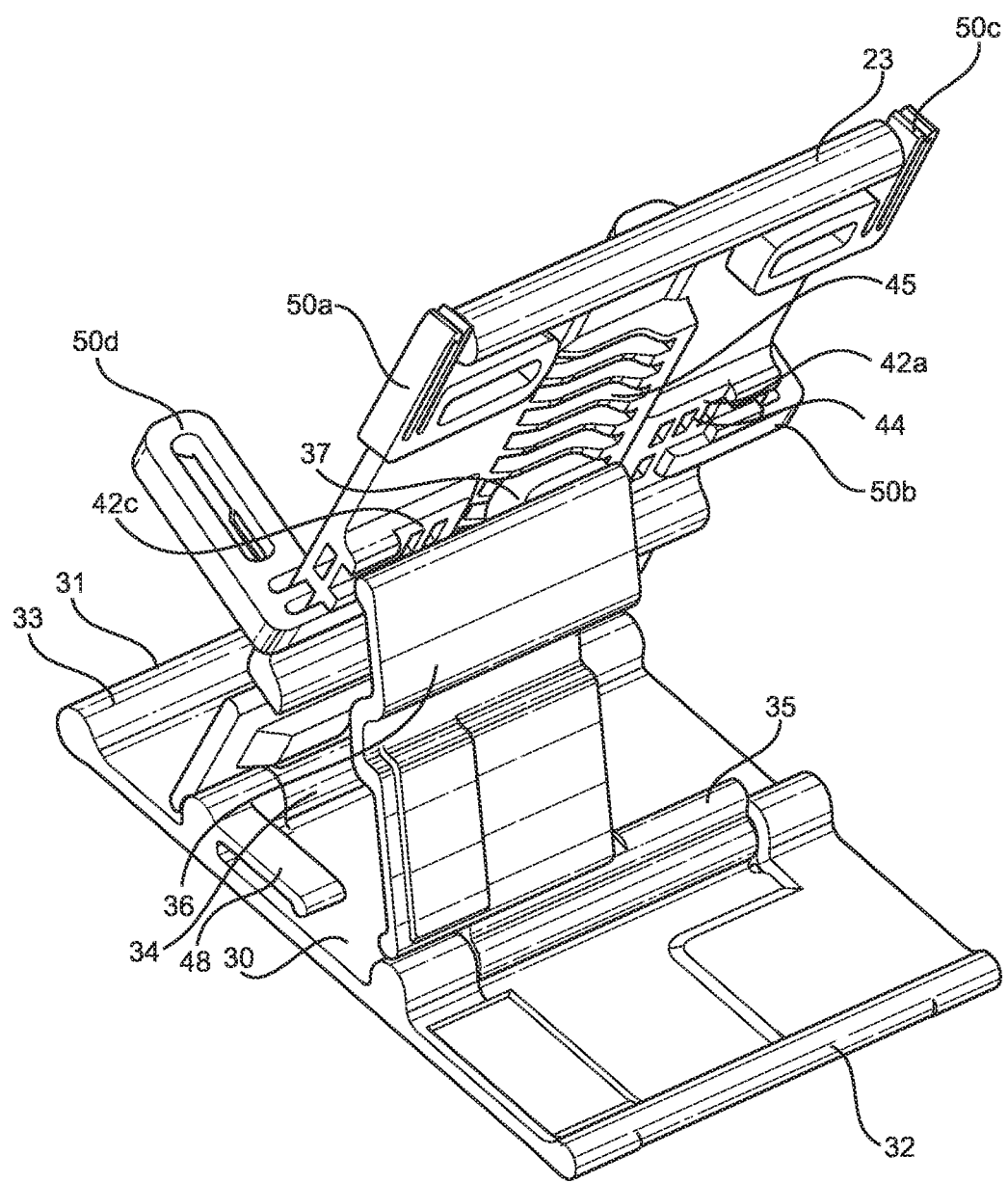
FIG. 7 is a rear perspective view of a mobile device support system ready for use in accordance with an example embodiment.

Continuing to reference FIG. 6A, it can be seen that each of the second connectors 42a, 42b, 42c, 42d may include one or more locking receivers 44 for removably locking each arm 50a, 50b, 50c, 50d in an engaged position with each second connector 42a, 42b, 42c, 42d. The locking receivers 44 may comprise openings or slots formed within each of the second connectors 42a, 42b, 42c, 42d, with the locking receivers 44 being adapted to engage with a corresponding hook 57 on each of the arms 50a, 50b, 50c, 50d to releasably lock the arms 50a, 50b, 50c, 50d in engagement with a second connector 42a, 42b, 42c, 42d such as shown in FIG. 7.

Each of the second connectors 42a, 42b, 42c, 42d may include multiple locking receivers 44 which are horizontally aligned such that the arms 50a, 50b, 50c, 50d may be selectively engaged with different locking receivers 44 to adjust the positioning of the arms 50a, 50b, 50c, 50d (e.g., the distance each arm 50a, 50b, 50c, 50d extends outwardly from the respective sides 25, 26 of the support member 20). In this manner, the effective usable length of each arm 50a, 50b, 50c, 50d extending outwardly from the sides 25, 26 of the support member 20 may be adjusted as-needed to support different mobile devices 80 (e.g., mobile devices 80 of different widths).

Figure 13:
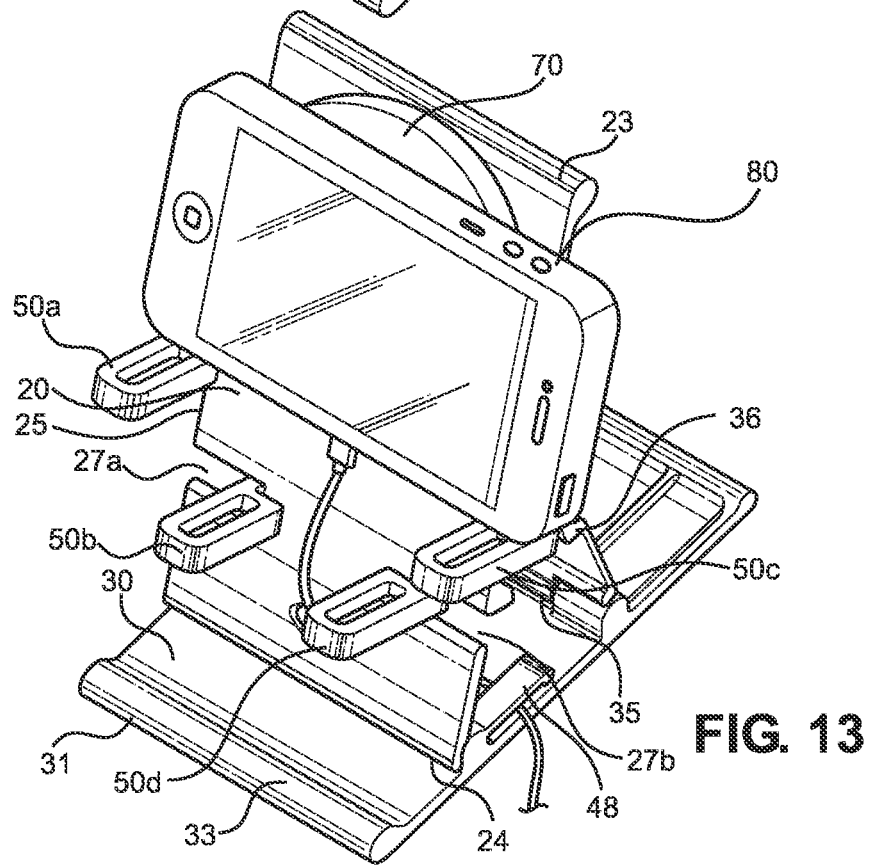
FIG. 13 is a perspective view of a mobile device support system in use supporting a mobile device comprised of a mobile phone in a horizontal orientation in accordance with an example embodiment.

When connected to the support member 20 in the second position by the second connectors 42a, 42b, 42c, 42d, the arms 50a, 50b, 50c, 50d may function as barriers to both support the mobile device 80 and to prevent the mobile device 80 from slipping off the sides 25, 26 of the support member 20. The arms 50a, 50b, 50c, 50d may, in the second position, support mobile devices 80 in both a vertical (e.g., portrait) orientation and a horizontal (e.g., landscape) orientation. An exemplary embodiment showing a mobile device 80 being supported by arms 50a, 50b, 50c, 50d in the second position is shown in FIGS. 12 and 13.

With reference to FIGS. 6A and 6B, it can be seen that a central portion of the inner surface 22 of the support member 20 may include a plurality of adjustment receivers 45 (e.g., notches) which are defined by a plurality of ribs extending from the inner surface 22 of the support member 20. The adjustment receivers 45 may be utilized to removably engage with a corresponding adjustment member 36 so as to adjust the position and orientation of the support member 20 with respect to the base 30 as described in more detail below. Using the adjustment member 36 to selectively engage with one of the adjustment receivers 45, the angle of the support member 20 with respect to the base 30 (i.e., the tilt or angle of inclination of the support member 20) may be adjusted to accommodate different mobile devices 80 and preferences of users.

As best shown in FIGS. 7-10, the support member 20 may be adjustable between a third position and a fourth position with respect to the base 30. In the third position, the support member 20 is parallel to the base 30 such as shown in FIGS. 9 and 10. Thus, when in the third position, the support member 20 is collapsed onto the base 30 for easy storage or transport. When so collapsed, the entire assembly may be easily fit within a pocket for transport.

Figure 8:
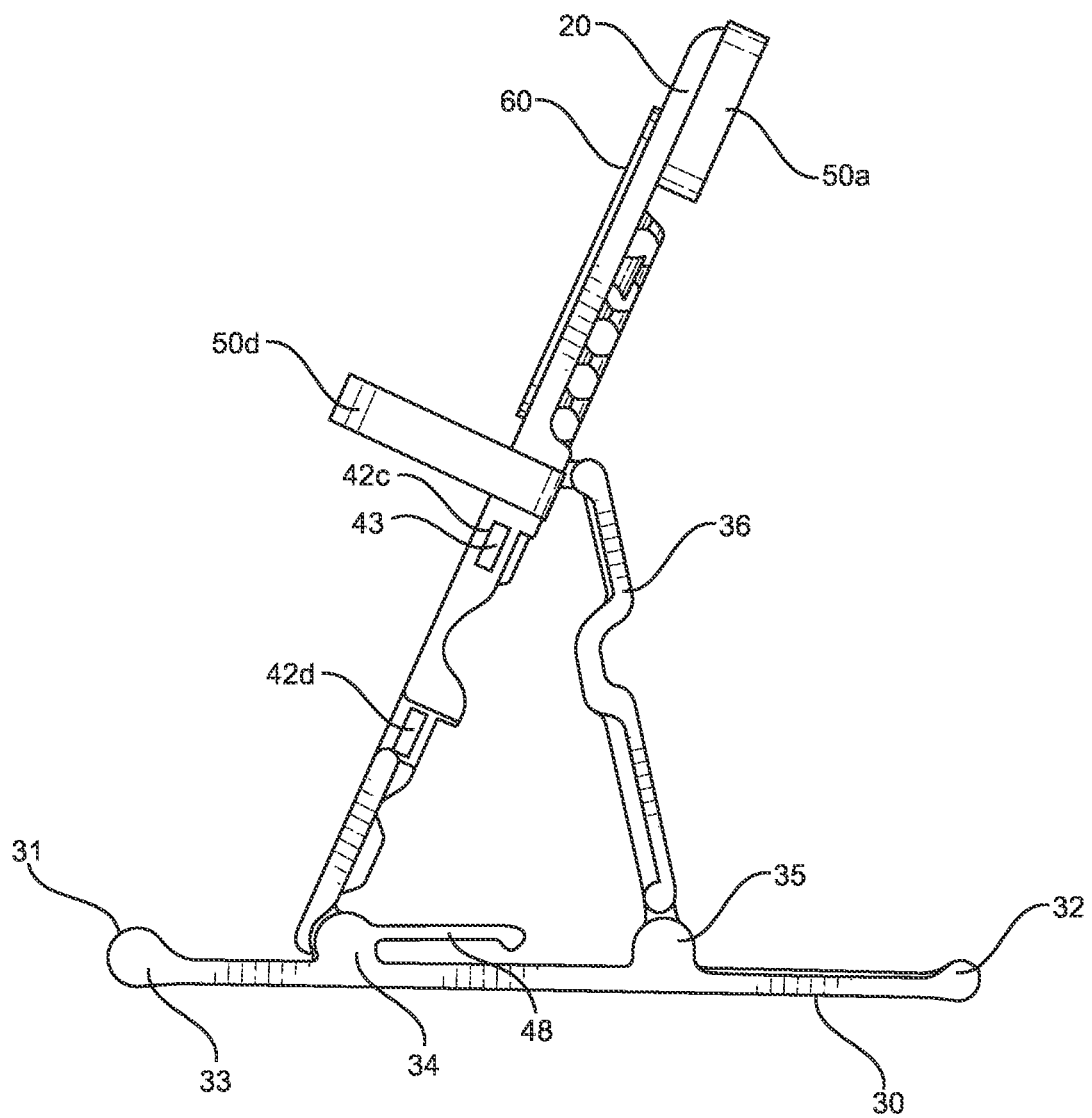
FIG. 8 is a side view of a mobile device support system ready for use in accordance with an example embodiment.

In the fourth position, the support member 20 is not parallel to the base 30, but is instead positioned at various angles/inclines with respect to the base 30 such as shown in FIGS. 7 and 8. The angle of incline of the support member 20 with respect to the base 30 may be adjusted by selecting which of the adjustment receivers 45 to which the adjustment member 36 is selectively and removably engaged as discussed herein. Such a position is ideal for use, and the use of the adjustment member 36 and adjustment receivers 45 allows for the angle of incline of the mobile device 80 to be adjusted to suit each user's needs. The range of angles of incline available may vary in different embodiments. By way of example and without limitation, the fourth position of the support member 20 may be between a 25 degree angle and a 90 degree angle with respect to the base 30.

Figure 3A:
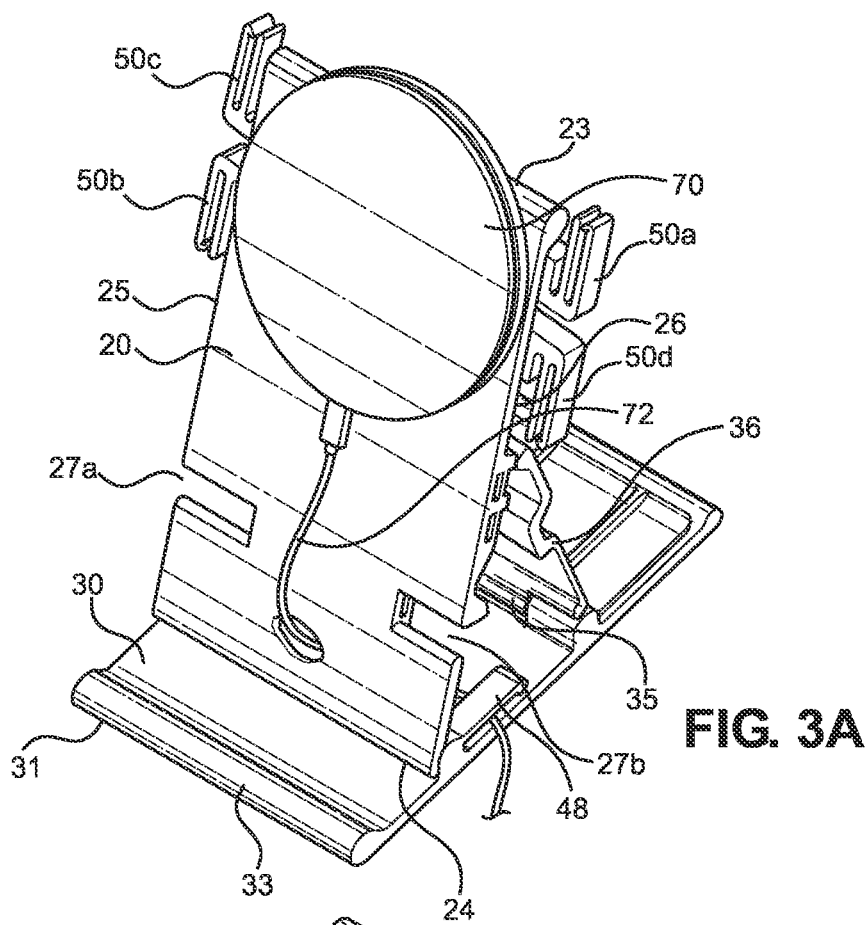
FIG. 3A is a perspective view of a mobile device support system in an upright, vertical orientation with an attached wireless charger and arms in a parallel position in accordance with an example embodiment.
Figure 3B:
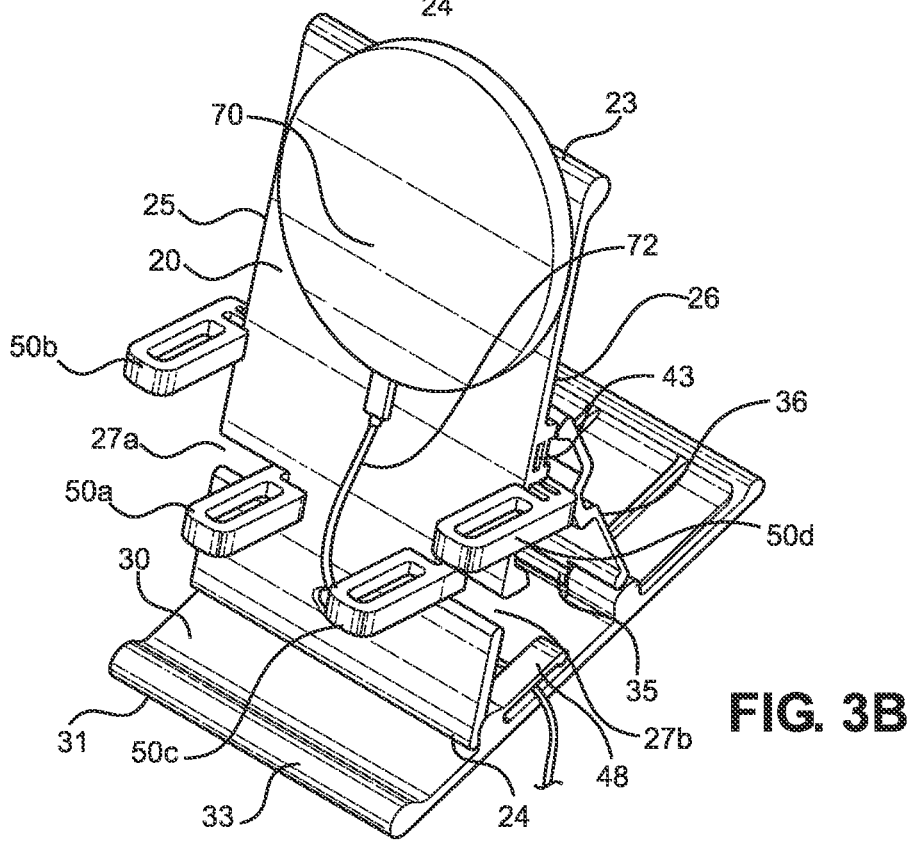
FIG. 3B is a perspective view of a mobile device support system in a diagonal upright orientation with an attached wireless charger and arms in a perpendicular position in accordance with an example embodiment.

As best shown in FIGS. 3A and 3B, the support member 20 may include an opening 47 adapted to receive a cord 72 of a wireless charger 70 or, in some embodiments, a cord extending from the mobile device 80. The opening 47 may be positioned near the lower end 24 of the support member 20 as shown in the figures, or may be positioned at various other locations on the support member 20. As shown in FIGS. 3A and 3B, the cord 72 of a wireless charger 70 may be inserted through the opening 47 to be plugged into a wall socket. In some embodiments in which a wireless charger 70 is not used, a charging cord may be inserted through the opening 47 to be connected to the mobile device 80 to charge the mobile device 80 while it is supported on the support member 20.

As best shown in FIGS. 1-10, the mobile device support system may include a base 30 which is adapted to rest upon a surface to support the support member 20. The base 30 may comprise a rectangular, flat member such as shown in the figures, or may be comprised of various other shapes and configurations. In the embodiment shown in the figures, it can be seen that the base 30 includes a front end 31 and a rear end 32.

With reference to FIGS. 6A-10, it can be seen that the support member 20 may be pivotably (e.g., hingedly) connected to the base 30 such that the support member 20 may be pivoted with respect to the base 30. More specifically, it can be seen that the base 30 may include a first hinge 34 to which the lower end 24 of the support member 20 is connected. The first hinge 34 is illustrated as being positioned near a front end 31 of the base 30. However, in some embodiments, the first hinge 34 may be positioned at various other locations on the base 30.

Continuing to reference FIGS. 6A-10, it can be seen that the first hinge 34 extends from an upper surface of the base 30. The lower end 24 of the support member 20 is connected to the first hinge 34 such that the support member 20 may be pivoted with respect to the base 30 between at least a third position (parallel to the base 30) and one of a plurality of fourth positions (not parallel to the base 30).

As best shown in FIGS. 7 and 8, the base 30 may include a second hinge 35 which is distally positioned away from the first hinge 34. An adjustment member 36 is pivotably connected to the second hinge 35 such that the adjustment member 36 may pivot with respect to the base 30. The adjustment member 36 may comprise a tab-like structure having a substantially rectangular shape as shown in the figures, or may be comprised of various other shapes and configurations.

The adjustment member 36 may include an adjustment connector 37 at its distal end, with the adjustment connector 37 being adapted to selectively and removably engage within one of the adjustment receivers 45 on the inner surface 22 of the support member 20 so as to adjust the angle of incline between the support member 20 and the base 30. The adjustment connector 37 may comprise a projection adapted to fit within one of the adjustment receivers 45 of the support member 20 such that the adjustment member 36 supports the support member 20 in its upright or angled fourth position with respect to the base 30.

When it is desired to collapse the support member 20 onto the base 30, such as for transport or storage, the adjustment member 36 may be disengaged from the adjustment receivers 45 of the support member 20, and the adjustment member 36 may be laid flat upon the upper surface of the base 30. The support member 20 may then be pivoted into its third position with respect to the base 30, with the support member 20 resting upon the base 30 and the adjustment member 36 being sandwiched between the support member 20 and the base 30 as shown in FIGS. 9 and 10.

As shown in FIGS. 1, 15, and 16, the base 30 may include a lip 33 at or near its front end 31 for supporting a mobile device 80. The lip 33 may comprise a raised portion of the base 30 at or near its front end 31 which prevents a mobile device 80 from sliding off of the front end 31 of the base 30. The lip 33 may comprise a curved shape as shown in the figures, or may comprise various other configurations such as, for example, a flange or other type of protrusion extending from the base 30.

As best shown in FIGS. 1—3B, 7, 8, 12, and 13, the base 30 may include a clip 48 under which the cord 72 may be routed. The clip 48 may comprise a raised projection comprised of a resilient or rigid material under which the cord 72 may be inserted. The use of the clip 48 to secure a cord 72 is shown in FIGS. 3A, 3B, 12, and 13. As shown in those figures, the cord 72 may be secured underneath the clip 48 prior to being routed elsewhere (e.g., to be plugged into another device or a power source). The use of the clip 48 ensures that the cord 72 does not come loose or move around, which can cause tangling or inadvertent unplugging of the cord 72.

As shown throughout the figures, the mobile device support system may include a plurality of arms 50a, 50b, 50c, 50d which are each selectively and removably connectable to the support member 20 in various positions and orientations to enhance the functionality of the support member 20 and to accommodate different types, positions, and orientations of mobile devices 80. Generally, each of the arms 50a, 50b, 50c, 50d may be interchangeably and removably connected to either one of the first connectors 40a, 40b, 40c, 40d in the first position (parallel to the support member 20) or one of the second connectors 42a, 42b, 42c, 42d in the second position (not parallel to the support member 20).

Exemplary arms 50a, 50b, 50c, 50d are best shown in FIGS. 11A-11D. As shown, each arm 50a, 50b, 50c, 50d may comprise an L-shaped member including a first portion 51 and a second portion 52. The first and second portions 51, 52 are perpendicular to each other to form the L-shaped configuration shown in the figures. The first portion 51 of each arm 50a, 50b, 50c, 50d includes an opening 53 for engaging with one of the first connectors 40a, 40b, 40c, 40d of the support member 20 and the second portion 52 of each arm 50a, 50b, 50c, 50d includes a pair of parallel elongated members 55, 56 for engaging with one of the second connectors 42a, 42b, 42c, 42d of the support member 20.

Continuing to reference FIGS. 11A-11D, it can be seen that the first portion 51 of each arm 50a, 50b, 50c, 50d includes a central opening 53. An outer indentation 54 extends partially through the first portion 51 of each arm 50a, 50b, 50c, 50d, partially surrounding the central opening 53. The opening 53 and/or the outer indentation 54 may function as a female connector adapted to matingly and removably engage with a corresponding first connector 40a, 40b, 40c, 40d of the support member 20 to removably connect the arm 50a, 50b, 50c, 50d to the support member 20 such as shown in FIG. 6B.

With reference to FIGS. 11A-11D, it can be seen that the second portion 52 of each arm 50a, 50b, 50c, 50d may comprise a pair of elongated members 55, 56 which extend perpendicularly with respect to the first portion 51. The pair of elongated members 55, 56 may comprise a first elongated member 55 and a second elongated member 56 which are spaced-apart and parallel so as to define a slot 58 between them. The second elongated member 56 may comprise a resilient material such that the second elongated member 56 may bend or pivot slightly and then return to its original position.

Figure 11A:
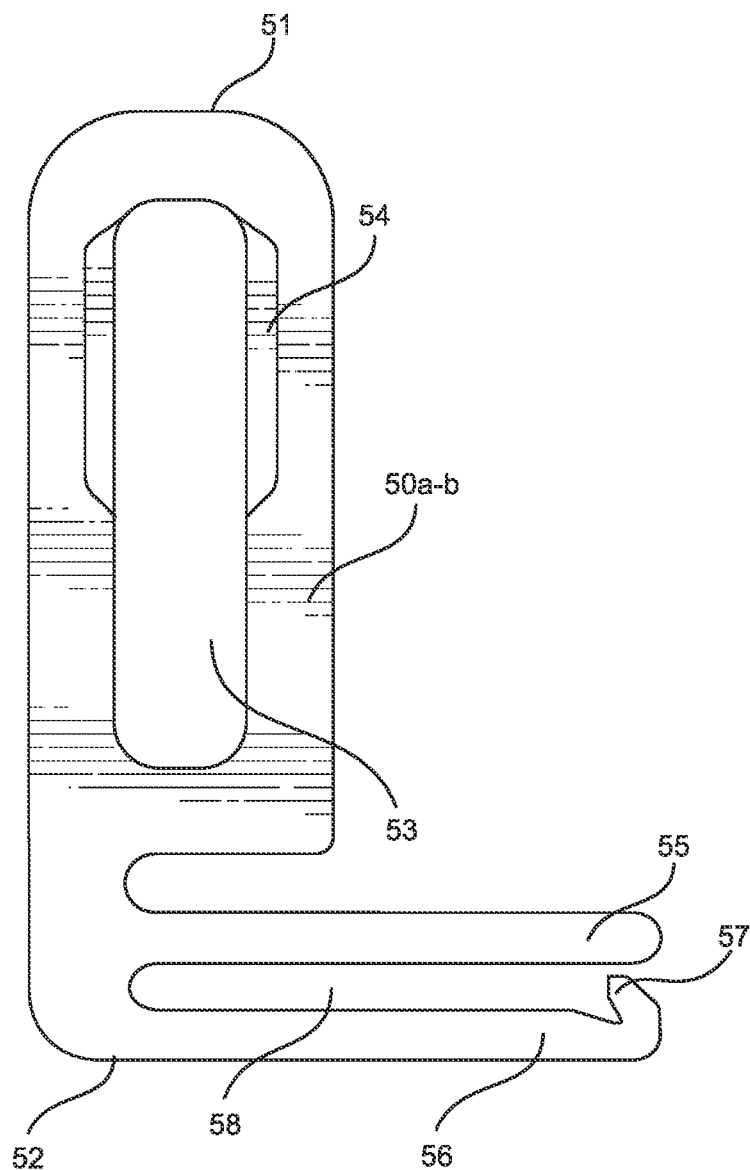
FIG. 11A is a top view of a first embodiment of a first arm of a mobile device support system in accordance with an example embodiment.
Figure 11B:
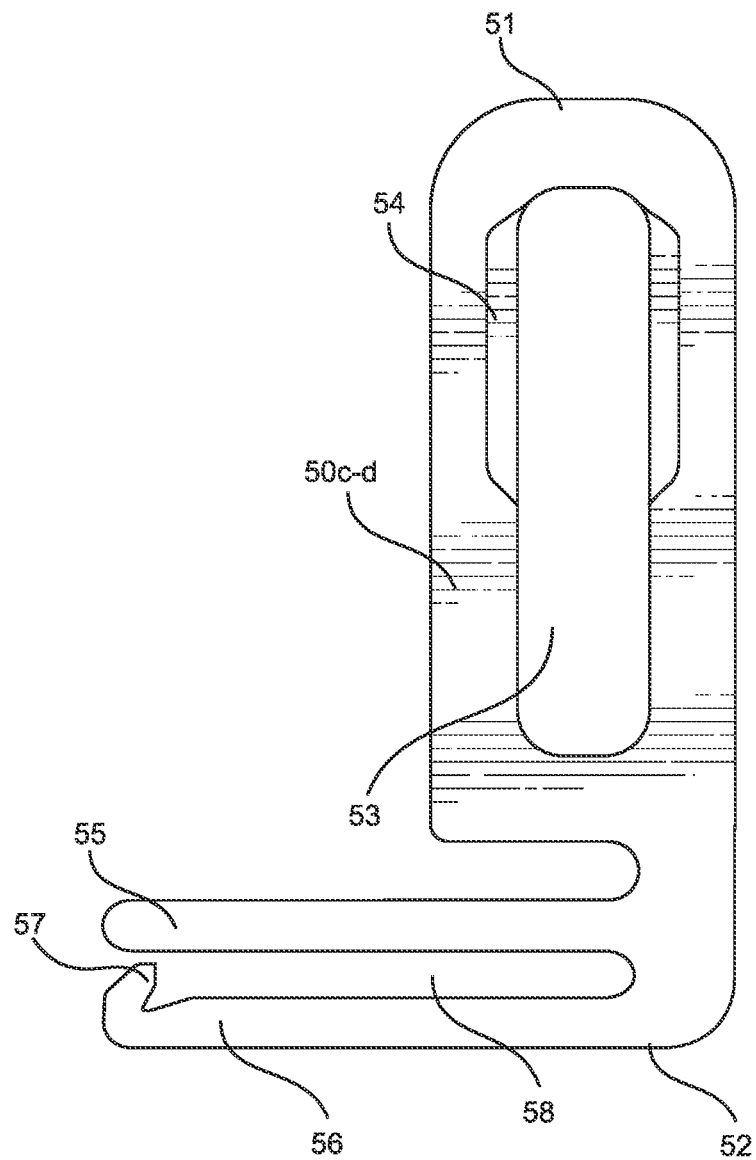
FIG. 11B is a top view of a first embodiment of a second arm of a mobile device support system in accordance with an example embodiment.
Figure 11C:
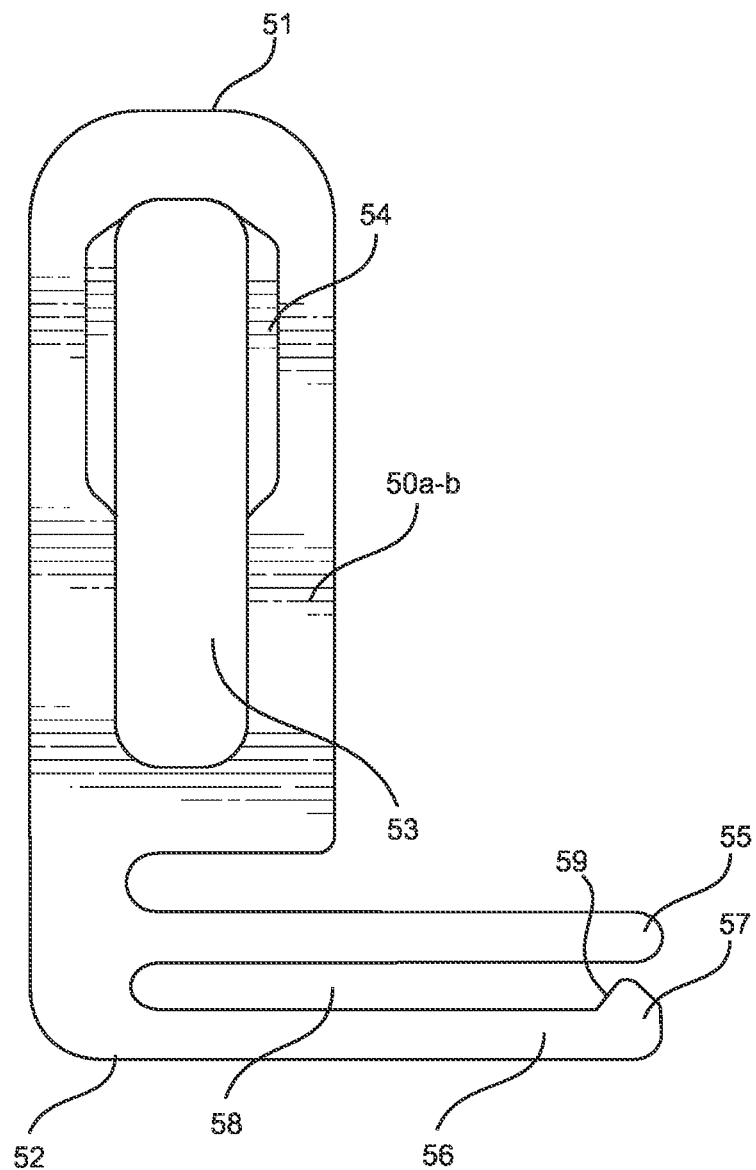
FIG. 11C is a top view of a second embodiment of a first arm of a mobile device support system in accordance with an example embodiment.
Figure 11D:
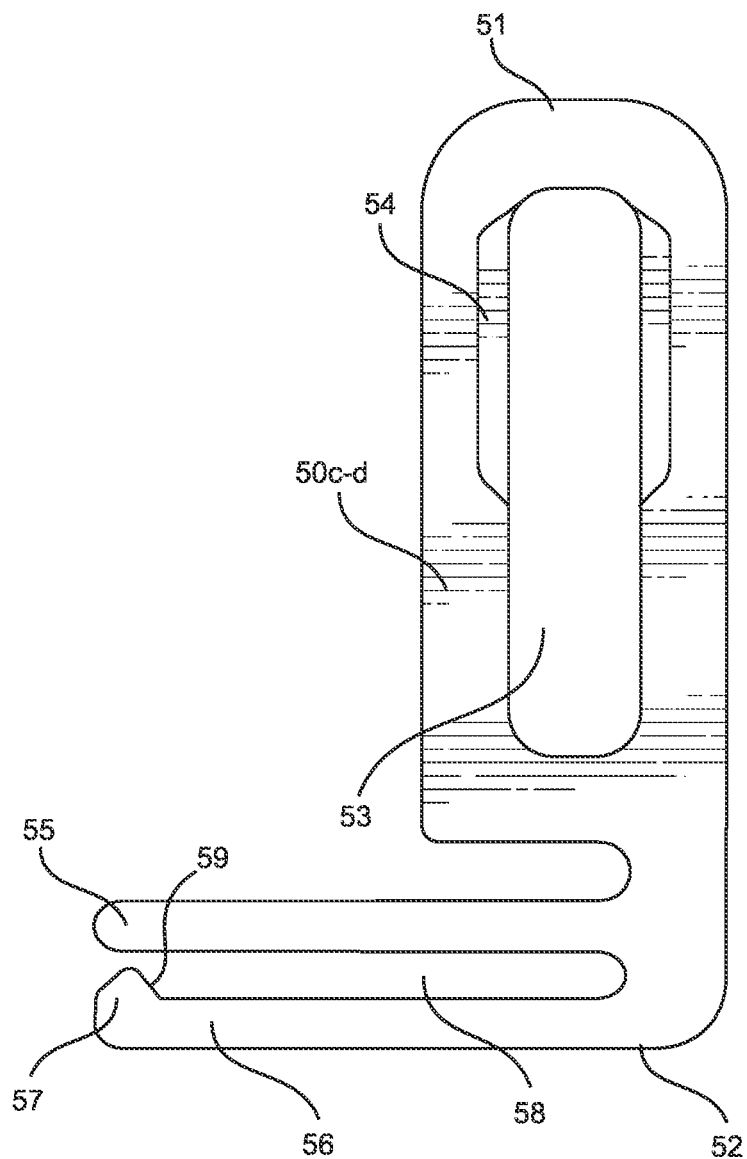
FIG. 11D is a top view of a second embodiment of a second arm of a mobile device support system in accordance with an example embodiment.

It should be appreciated that different types of arms 50a, 50b, 50c, 50d may be utilized with the same embodiment. FIG. 11A illustrates a first embodiment of first and second arms 50a, 50b which may be removably secured to the support member 20. FIG. 11B illustrates a first embodiment of third and fourth arms 50c, 50d which may be removably secured to the support member 20. FIG. 11C illustrates a second embodiment of first and second arms 50a, 50b which may be removably secured to the support member 20. FIG. 11D illustrates a second embodiment of third and fourth arms 50c, 50d which may be removably secured to the support member 20.

While the figures illustrate particular orientations and positions for each of the arms 50a, 50b, 50c, 50d, it should be appreciated that each of the arms 50a, 50b, 50c, 50d may be mixed-and-matched as-needed, and secured to the support member 20 in different positions and orientations. Thus, the positions and orientations of the arms 50a, 50b, 50c, 50d shown in the figures, and described herein, should not be construed as limiting in scope.

By way of non-limiting example, the arms 50a, 50b, 50c, 50d could in some embodiments include outer indentations 54 on both sides of the arms 50a, 50b, 50c, 50d to allow for each arm 50a, 50b, 50c, 50d to be attached to each connector 40a, 40b, 40c, 40d, 42a, 42b, 42c, 42d in different positions and orientations. As another non-limiting example, one or more of the arms 50a, 50b, 50c, 50d may be omitted (e.g., only two of the four available arms 50a, 50b, 50c, 50d could be attached to the support member 20) so as to allow for positioning and orientation that would not be otherwise possible if additional arms 50a, 50b, 50c, 50d were attached.

The first and second arms 50a, 50b may comprise a mirrored-version of the third and fourth arms 50c, 50d, with the primary difference between the first and second arms 50a, 50b, and the third and fourth arms 50c, 50d, being the positioning of the outer indentation 54. As shown in FIGS. 11A and 11B, it can be seen that the outer indentation 54 is on a first side of the first and second arms 50a, 50b, and on a second, opposite side of the third and fourth arms 50c, 50d. Thus, the first and second arms 50a, 50b are a mirror version of the third and fourth arms 50c, 50d. Such a configuration allows the arms 50a, 50b, 50c, 50d to be connected to different locations of the support member 20 in different orientations as shown throughout the figures.

The distal end of the second elongated member 56 is shown as including a hook 57 adapted to engage with the second connectors 42a, 42b, 42c, 42d of the support member 20 to removably secure the arm 50a, 50b, 50c, 50d to the support member 20. More specifically, the hook 57 of each arm 50a, 50b, 50c, 50d of the respective second connectors 42a, 42b, 42c, 42d may be adapted to removably engage within one of the locking receivers 44 of the second connectors 42a, 42b, 42c, 42d such as shown in FIG. 7. In the figures, it can be seen that the hook 57 faces towards the first elongated member 55. In some embodiments, the hook 57 may instead be positioned on the first elongated member 55, facing the second elongated member 56.

FIGS. 11A and 11B illustrate a first embodiment of arms 50a, 50b, 50c, 50d having a first embodiment of a hook 57. The first embodiment of the arms 50a, 50b, 50c, 50d may require that the arm 50a, 50b, 50c, 50d, or portions of the arm 50a, 50b, 50c, 50d, need to be pulled on or otherwise adjusted in order to disengage the hook 57 to disconnect the arm 50a, 50b, 50c, 50d from the support member 20.

FIGS. 11C and 11D illustrate a second embodiment of arms 50a, 50b, 50c, 50d having a second embodiment of a hook 57. The second embodiment of the arms 50a, 50b, 50c, 50d are configured such that the arm 50a, 50b, 50c, 50d need only be pulled outwardly to remove the arm 50a, 50b, 50c, 50d from the support member 20.

The second embodiment of the hook 57 may include a ramped portion 59 which is designed to avoid the hook 57 catching upon any portion of the support member 20 in a manner that would require additional steps to remove the arm 50a, 50b, 50c, 50d. Such a configuration allows the second embodiment of the arms 50a, 50b, 50c, 50d to be moved and removed from the support member 20 by simply pulling from the outside, thus causing the arm 50a, 50b, 50c, 50d to automatically release with no extra steps.

It should be appreciated that the configuration, size, placement, and angle of the ramped portion 59 may vary in different embodiments. A steeper angle of the ramped portion 59 of the hook 57 will require a greater outward force to disengage the arm 50a, 50b, 50c, 50d from the support member 20. Conversely, a less steep angle of the ramped portion 59 of the hook 57 will permit the arm 50a, 50b, 50c, 50d to be disengaged with less force while increasing the risk that the arm 50a, 50b, 50c, 50d may inadvertently slip out of engagement with the support member 20. Any angle may be utilized for different embodiments.

As shown throughout the figures, each arm 50a, 50b, 50c, 50d may be adapted to be removably connected to the support member 20 in a first position or a second position. In the first position, each arm 50a, 50b, 50c, 50d is parallel to the support member 20 as to increase the effective width of the support member 20 such as shown in FIGS. 1 and 3A. In the second position, each arm 50a, 50b, 50c, 50d is perpendicular to the support member 20 so as to retain a mobile device 80 against the support member 20 without sliding off of its sides 25, 26.

Generally, the first portion 51 of the arms 50a, 50b, 50c, 50d will be adapted to engage with one of the first connectors 40a, 40b, 40c, 40d to secure the arms 50a, 50b, 50c, 50d in the first position. The first portion 51 of the arms 50a, 50b, 50c, 50d is illustrated as including an opening 53 and outer indentation 54 which function as a female connector into which the male first connectors 40a, 40b, 40c, 40d may be inserted to matingly engage the arms 50a, 50b, 50c, 50d to the support member 20 in the first position such as shown in FIGS. 1 and 3A. In this manner, each of the arms 50a, 50b, 50c, 50d may "snap" onto a corresponding first connector 40a, 40b, 40c, 40d to removably connect the arms 50a, 50b, 50c, 50d to the support member 20 in the first position.

Similarly, the second portion 52 of the arms 50a, 50b, 50c, 50d will be adapted to engage with one of the second connectors 42a, 42b, 42c, 42d to secure the arms 50a, 50b, 50c, 50d in the second position. The second portion 52 of the arms 50a, 50b, 50c, 50d is illustrated as including a pair of elongated members 55, 56 and a hook 57 which function as a male connector that may be inserted and secured within one of the female second connectors 42a, 42b, 42c, 42d to matingly engage the arms 50a, 50b, 50c, 50d to the support member 20 in the second position such as shown in FIGS. 2A, 2B, and 3B.

The first elongated member 55 may be inserted within the socket 43 of one of the second connectors 42a, 42b, 42c, 42d such as shown in FIG. 7. In embodiments in which one or more of the second connectors 42a, 42b, 42c, 42d includes multiple sockets 43, the socket 43 may be selected based upon the user's needs and the type of mobile device 80 being supported. The hook 57 engages within one of the locking receivers 44 in the second connectors 42a, 42b, 42c, 42d to lock the arms 50a, 50b, 50c, 50d in place.

The manner by which the arms 50a, 50b, 50c, 50d may be removed from the second connectors 42a, 42b, 42c, 42d may vary in different embodiments. As a non-limiting example; a user may apply slight force to the second elongated member 56 to disengage the hook 57 from within the locking receiver 44 to allow the arms 50a, 50b, 50c, 50d to be removed from the second connectors 42a, 42b, 42c, 42d when desired.

As a further non-limiting example, the arms 50a, 50b, 50c, 50d illustrated in FIGS. 11A and 11B may be removed from the second connectors 42a, 42b, 42c, 42d by grasping the first portion 51 of the arm 50a, 50b, 50c, 50d and applying inward force, which will cause the second elongated member 56 to shift and the hook 57 to disengage so that the arm 50a, 50b, 50c, 50d may be pulled away. Any number of other methods may be utilized to provide the same function of disengaging the arm 50a, 50b, 50c, 50d from a second connector 42a, 42b, 42c, 42d.

As an additional non-limiting example, the arms 50a, 50b, 50c, 50d illustrated in FIGS. 11C and 11D may be removed from the second connectors 42a, 42b, 42c, 42d by simply grasping any portion of the arm 50a, 50b, 50c, 50d and pulling outwardly away from the support member 20. The ramped portions 59 of each hook 57 of each arm 50a, 50b, 50c, 50d will pass over the second connectors 42a, 42b, 42c, 42d to allow each arms 50a, 50b, 50c, 50d to be easily disengaged without any additional steps.

As best shown in FIGS. 1-2B, the mobile device support system may optionally include a charger mount 60 to aid in removably securing a wireless charger 70 to the support member 20 for charging the mobile device 80 wirelessly. In some embodiments such as shown in FIGS. 4A and 10, a separate charger mount 60 may be omitted. In such embodiments, the wireless charger 70 may be omitted (in which case the support member 20 will function as a non-charging stand for the mobile device 80), or the wireless charger 70 may be secured directly to the outer surface 21 of the support member 20.

In other embodiments such as shown in FIGS. 1-2B and 4B, a charger mount 60 may be adjustably and removably connected to the support member 20, with the wireless charger 70 being adapted to be removably or permanently secured against the charger mount 60. The charger mount 60 may comprise a plate-like member which is adapted to be removably connected to the outer surface 21 of the support member 20.

As best shown in FIGS. 2A and 2B, the charger mount 60 may comprise an outer surface 61 which faces away from the support member 20 and an inner surface 62 which faces towards and is secured against the support member 20. The inner surface 62 of the charger mount 60 may include a pair of connectors 64a, 64b comprised of male-type projections 65, 66 that are spaced-apart on the inner surface 62 of the charger mount 60 so as to define slots 67a, 67b between the projections 65, 66.

Each of the connectors 64a, 64b may comprise a plurality of projections 65, 66, with the first connector 64a comprising first projections 65 and the second connector 64b comprising second projections 66. A first slot 67a is defined between the first projections 65 and a second slot 67b is defined between the second projections 66 such as shown in FIG. 2A. An elongated projection 68 may be positioned between the first and second connectors 64a, 64b.

The connectors 64a, 64b on the inner surface 62 of the charger mount 60 may be adapted to matingly and removably engage with corresponding receivers 28a, 28b on the outer surface 21 of the support member 20. As best shown in FIG. 2A, each of the receivers 28a, 28b of the support member 20 includes a plurality of slots 39a, 39b into which the connectors 64a, 64b may be selectively inserted to adjust the positioning of the charger mount 60 on the outer surface 21 of the support member 20. By selectively inserting the projections 65, 66 of the connectors 64a, 64b within a selected pair of slots 39a, 39b in the receivers 28a, 28b, a user may adjust the positioning (e.g., the height) of the charger mount 60 on the support member 20. When so secured, the elongated projection 68 of the charger mount 60 may engage within the central groove 29 of the support member 20.

Whether including a charger mount 60 or not, a wireless charger 70 may be removably secured against the support member 20 such as shown in FIGS. 3A and 3B. The manner by which the wireless charger 70 is removably secured to the support member 20 may vary in different embodiments. By way of example and without limitation, the wireless charger 70 may be removably connected to the support member 20 by adhesives, tape (e.g., double-sided tape), straps, clasps, brackets, connectors, magnets, and the like. In embodiments in which a charger mount 60 is omitted, the wireless charger 70 may be secured directly against the outer surface 21 of the support member 20. In embodiments in which a charger mount 60 is utilized, the wireless charger 70 may be secured against the charger mount 60, which itself is connected to the outer surface 21 of the support member 20. In either case, the cord 72 of the wireless charger 70 may extend through an opening 47 in the support member 20 to be plugged in elsewhere. As shown in FIGS. 3A, 3B, 12, and 13, the cord 72 may also be routed and secured underneath a clip 48 in some embodiments.

As best shown in FIGS. 3A and 3B, a wireless charger 70 may be removably secured to the outer surface 21 of the support member 20, either using a charger mount 60 or not. Various types of wireless chargers 70 known in the arts may be supported, including induction-based wireless chargers 70. By way of example and without limitation, the wireless charger 70 may comprise a MagSafe charger which is commonly associated with Apple devices such as iPhones. Various other types of wireless chargers 70 available and known in the arts may be utilized in combination with the systems and methods described herein, and thus the scope should not be limited in any regard with respect to the type of wireless charger 70 utilized.

In the figures, the wireless charger 70 is illustrated as comprising a round wireless charger 70 including a cord 72 extending therefrom. The wireless charger 70 may comprise various other shapes (e.g., rectangular, triangular, etc.), and thus should not be construed as limited to the round configuration shown in the figures. As previously discussed, the manner by which the wireless charger 70 is secured to the support member 20 (or to the charger mount 60) may vary in different embodiments, including but not limited to the use of adhesives, tape (e.g., double-sided tape), straps, clasps, brackets, connectors, magnets, and the like.

The systems and methods described herein may be utilized with a wide range of mobile devices 80 known in the art. The descriptions and exemplary figures herein thus should not be construed as limiting in any manner the type of mobile device 80 that may be supported by the support member 20. By way of example and without limitation, the mobile device 80 may comprise a mobile phone, calculator, tablet, GPS, smart watch, charging bank, various computing devices, and the like. In some embodiments, a separate charger may be supported (e.g., a charger for headphones such as wireless ear buds). Thus, any type of mobile device 80 that needs to be charged (either wirelessly or by wires) may be supported. The support member 20 may also support non-electronic devices when needed, such as books, magazines, newspapers, pamphlets, and the like.

The figures illustrate a range of exemplary mobile devices 80 being supported in various positions and orientations using the systems and methods described herein. FIGS. 3A and 3B illustrate a wireless charger 70 secured to a support member 20, ready for use in charging a mobile device 80. FIG. 12 illustrates a mobile device 80 comprised of a mobile phone supported by the support member 20 in a portrait (i.e., vertical) orientation. FIG. 13 illustrates a mobile device 80 comprised of a mobile phone supported by the support member 20 in a landscape (i.e., horizontal) orientation.

Figure 14:
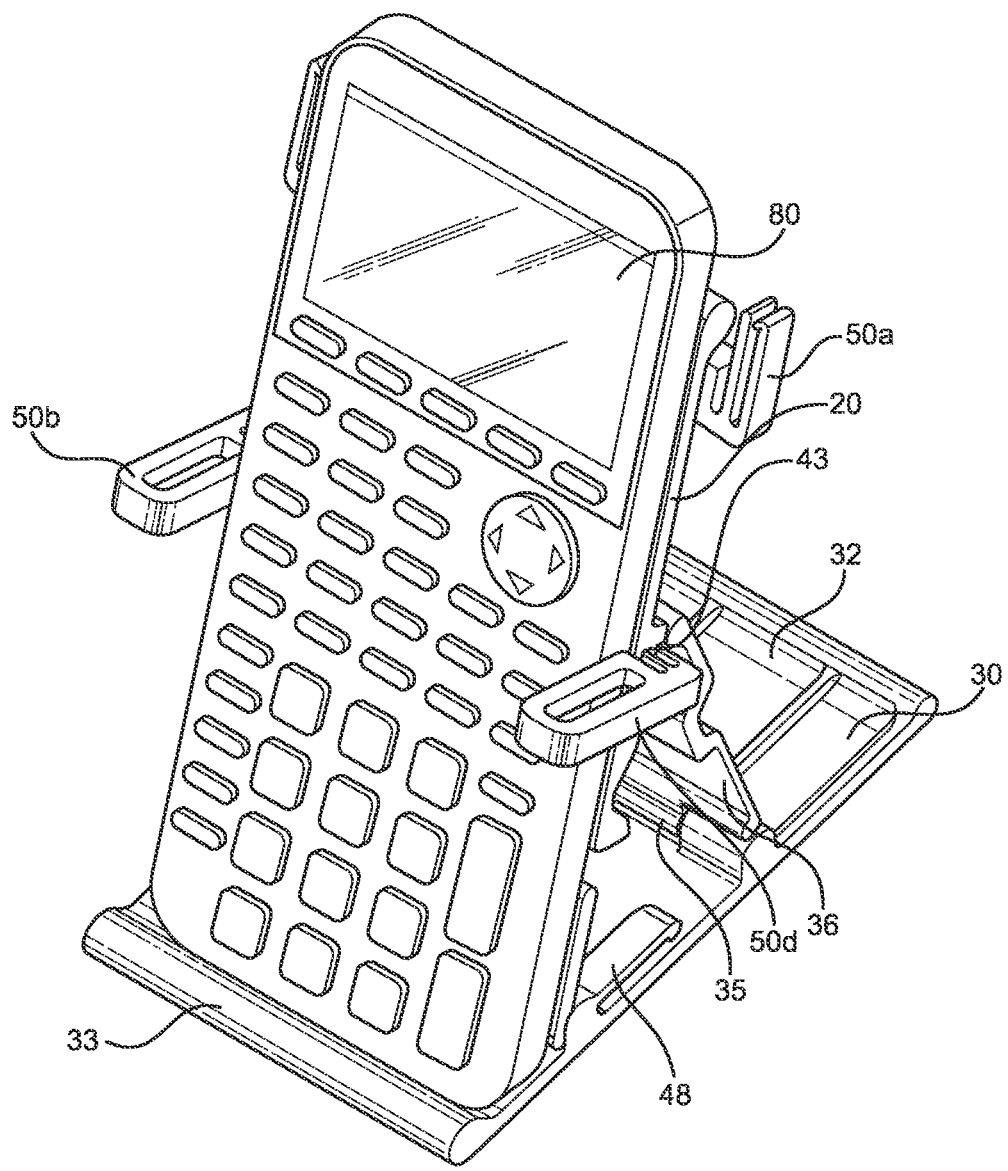
FIG. 14 is a perspective view of a mobile device support system in use supporting a mobile device comprised of a calculator in a vertical orientation in accordance with an example embodiment.

FIG. 14 illustrates a mobile device 80 comprised of a calculator supported by the support member 20 in a portrait orientation. FIG. 15 illustrates a mobile device 80 comprised of a tablet supported by the support member 20 in a portrait orientation. FIG. 16 illustrates a mobile device 80 comprised of a tablet supported by the support member 20 in a landscape orientation.

It should be appreciated that each of the foregoing figures is merely for illustrative purposes, and in no way should be construed as limiting in scope. As previously discussed, a wide range of mobile devices 80, including mobile devices 80 not shown in the figures but known in the art, may be utilized with the systems and methods described herein.

In use, the mobile device support system may be adjusted between a collapsed position in which the support member 20 is parallel to and rests against the base 30, and an extended position in which the support member 20 is not parallel to the base 30, but instead extends upwardly from the base 30 at various angles of incline.

The collapsed position of the support member 20 and base 30 is shown in FIGS. 4A, 5, 9, and 10. In such a collapsed position, the support member 20 rests against the base 30 in a collapsed, folded position. Such a collapsed position is useful for transporting or storing the mobile device support system. For example, the mobile device support system may easily be placed in one's pockets or within the pocket of a carrying bag such as a purse, duffel bag, or the like.

When desired, the support member 20 may be adjusted into its extended position for use such as shown in FIGS. 1—3B, 6B—8, and 12—16. To adjust the support member 20, a user need only grasp the support member 20 and pivot it with respect to the base 30 about the first hinge 34 upwardly away from the base 30. The user may then grasp the adjustment member 36 and pivot the adjustment member 36 with respect to the base 30 about the second hinge 35 until the adjustment connector 37 is aligned with the adjustment receiver 45 corresponding to the desired angle of inclination of the support member 20.

In the embodiment shown in FIG. 6B, it can be seen that multiple adjustment receivers 45 are vertically-aligned along the inner surface 22 of the support member 20. Each adjustment receiver 45 corresponds to a different angle of inclination between the support member 20 and the base 30. The adjustment receivers 45 towards the lower end 24 of the support member 20 correspond with a greater angle of inclination, and the adjustment receivers 45 towards the upper end 23 of the support member 20 correspond with a lesser angle of inclination.

The user may adjust the adjustment member 36 to align the adjustment connector 37 with the desired adjustment receiver 45 corresponding to the desired angle of inclination of the support member 20. The user may then engage the adjustment connector 37 of the adjustment member 36 within the desired adjustment receiver 45 so that the adjustment connector 37 removably engages within the corresponding adjustment receiver 45. Upon releasing the support member 20, the support member 20 will rest upon the adjustment member 36 at the desired angle of inclination such as shown, e.g., in FIGS. 7 and 8. If desired, the user may release the adjustment member 36 by removing adjustment connector 37 from adjustment receiver 45 and pivoting the support member 20 towards the front end 31 of the base 30 and adjust the angle of inclination as-needed.

With the support member 20 in the extended position at an angle of inclination with respect to the base 30, the arms 50a, 50b, 50c, 50d may be configured to a user's needs. In some embodiments, the arms 50a, 50b, 50c, 50d may be omitted entirely such as shown in FIG. 6A. However, when desired, one or more arms 50a, 50b, 50c, 50d may be removably connected to the support member 20 in one or more desired positions and orientations.

The arms 50a, 50b, 50c, 50d may be connected to any of the first connectors 40a, 40b, 40c, 40d of the support member 20 in a parallel orientation so as to increase the effective width of the support member 20 to support wider mobile devices 80, or to support mobile devices 80 in a landscape orientation. Any desired arms 50a, 50b, 50c, 50d may be connected to one or more of the first connectors 40a, 40b, 40c, 40d in an orientation which is parallel to the support member 20 by "snapping" the opening 53 and/or outer indentation 54 of the first portion 51 of each arm 50a, 50b, 50c, 50d onto the corresponding first connector 40a, 40b, 40c, 40d. One need only apply downward force to snap the arms 50a, 50b, 50c, 50d onto the first connectors 40a, 40b, 40c, 40d.

FIGS. 3A, 4A, 5, 6B, 15, and 16 illustrate four arms 50a, 50b, 50c, 50d each being connected to the support member 20 in the first, parallel position. FIGS. 4B, 7, 8, and 14 illustrate two arms 50a, 50c being connected to first connectors 40a, 40c in the parallel position near the upper end 23 of the support member 20. As shown, the use of the first, parallel position of the arms 50a, 50b, 50c, 50d is useful for increasing the effective width of the support member 20.

One or more of the arms 50a, 50b, 50c, 50d may also or alternatively be connected to any of the second connectors 42a, 42b, 42c, 42d of the support member 20 in a non-parallel orientation so as to create barriers to hold the mobile device 80 on the support member 20 without slipping off the sides 25, 26 of the support member 20.

Any desired arms 50a, 50b, 50c, 50d may be connected to one or more of the second connectors 42a, 42b, 42c, 42d in an orientation which is not parallel (e.g., perpendicular) to the support member 20 by inserting the first elongated member 55 of the second portion 52 of each arm 50a, 50b, 50c, 50d into a socket 43 of a corresponding second connector 42a, 42b, 42c, 42d. The hook 57 of the second elongated member 56 will engage with a corresponding locking receiver 44 of the second connector 42a, 42b, 42c, 42d to releasably lock the arm 50a, 50b, 50c, 50d in the second position.

When desired, one need only apply outward force to the resilient second elongated member 56 of any arm 50a, 50b, 50c, 50d to disengage the hook 57 and thus allow the arm 50a, 50b, 50c, 50d to be removed from within the socket 43 of the second connector 42a, 42b, 42c, 42d. Alternatively, one may apply an inward force to the first portion 51 of any arm 50a, 50b, 50c, 50d which will cause the hook 57 to similarly disengage.

Any number of arms 50a, 50b, 50c, 50d may be connected in any number of positions and orientations to the support member 20 as desired to suit the needs of the user or to accommodate different mobile devices 80 or mobile device 80 orientations. FIGS. 2A, 2B, 3B, 12, and 13 each illustrate embodiments in which four arms 50a, 50b, 50c, 50d are each connected to a corresponding second connector 42a, 42b, 42c, 42d in the second (not parallel) position. FIGS. 1, 3A, 4A, 5, 6B, 15, and 16 each illustrate embodiments in which four arms 50a, 50b, 50c, 50d are each connected to a corresponding first connector 40a, 40b, 40c, 40d in the first (parallel) position. FIGS. 7, 8, and 14 each illustrate embodiments in which two arms 50a, 50c are connected to the first connectors 40a, 40c in the first position and two arms 50b, 50d are connected to the second connectors 42a, 42c in the second position.

Any combination of positions may be utilized as desired by the user. Since the second pair of second connectors 42b, 42d are closer to each other than the first pair of second connectors 42a, 42c, arms 50b, 50d connected to the second pair of second connectors 42b, 42d may be utilized to support the bottom end of the mobile device 80, with the mobile device 80 resting upon the arms 50b, 50d such as shown in FIG. 12. Alternatively, a mobile device 80 may rest upon the arms 50a, 50c connected to the second connectors 42a, 42c in a landscape orientation as shown in FIG. 13. Because the arms 50a, 50b, 50c, 50d are connectable to the support member 20 in multiple positions and orientations, the systems and methods described herein are versatile enough to support a wide range of mobile devices 80 in a wide range of positions and orientations.

As shown in FIGS. 3A and 3B, a wireless charger 70 may be connected to the support member 20 so as to wirelessly charge the mobile device 80 while the mobile device 80 is supported by the support member 20. The wireless charger 70 may in some embodiments be directly secured against the outer surface 21 of the support member 20. In other embodiments such as shown in FIGS. 1, 2B, 8, and 9, a charger mount 60 may be adjustably connected to the outer surface 21 of the support member 20 in various positions (e.g., heights) along the support member 20. The cord 72 of the wireless charger 70 may be inserted through the opening 47 of the support member 20 to connect to a wall socket or other power source. The cord 72 may also be routed and secured underneath the clip 48 to further secure the cord 72 in position.

The charger mount 60 may be secured at various positions to the support member 20 by engaging the projections 65, 66 of the charger mount 60 within corresponding receiver slots 39a, 39b of the receivers 28a, 28b of the support member 20 as previously discussed. FIGS. 1, 2B, 8, and 9 illustrate a charger mount 60 secured against the support member 20. The wireless charger 70 may then be secured against the charger mount 60 using a wide range of methods such as but not limited to adhesives, tape (e.g., double-sided tape), straps, clasps, brackets, connectors, magnets, and the like.

In some embodiments, the wireless charger 70 may be omitted entirely. In such embodiments, the support member 20 may simply function as a stand for the mobile device 80 without any charging functionality. In other embodiments, a charging cord 72 which is connected to a wall socket may be inserted through the opening 47 of the support member 20 to connect directly to the mobile device 80 for charging purposes. Such a charging cord 72 may also be routed and secured underneath a clip 48 on the base 30 in some embodiments.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A mobile device support system, comprising:
   a base;
   a support member for supporting a mobile device, wherein the support member is pivotably connected to the base; and
   a plurality of arms removably connected to the support member, wherein the plurality of arms are each connectable to the support member in a first position and a second position, wherein in the first position each of the plurality of arms is parallel to the support member, and wherein in the second position each of the plurality of arms is not parallel to the support member;
   wherein the support member includes a plurality of first connectors and a plurality of second connectors, wherein each of the plurality of arms is adapted to be connected to one of the plurality of first connectors in the first position, and wherein each of the plurality of arms is adapted to be connected to one of the plurality of second connectors in the second position; and
   wherein each of the plurality of arms is comprised of an opening for engaging with one of the plurality of first connectors.

2. The mobile device support system of claim 1, wherein each of the plurality of arms is comprised of a hook for engaging with one of the plurality of second connectors.

3. The mobile device support system of claim 1, wherein each of the plurality of first connectors is comprised of a projection, and wherein each of the plurality of second connectors is comprised of an opening.

4. The mobile device support system of claim 1, wherein the plurality of second connectors is comprised of a first pair of second connectors and a second pair of second connectors, wherein the second pair of second connectors are spaced closer together than the first pair of second connectors.

5. The mobile device support system of claim 1, wherein in the first position each of the plurality of arms is positioned on an upper half of the support member.

6. The mobile device support system of claim 5, wherein in the second position each of the plurality of arms is positioned on a lower half of the support member.

7. The mobile device support system of claim 1, wherein in the second position each of the plurality of arms is perpendicular to the support member.

8. The mobile device support system of claim 1, wherein each of the plurality of arms is comprised of an L-shaped member.

9. The mobile device support system of claim 1, wherein the support member is adjustable between a third position and a fourth position with respect to the base.

10. The mobile device support system of claim 1, wherein the base includes a front lip for supporting the mobile device.

11. The mobile device support system of claim 1, further comprising a wireless charger adapted to be removably connected to the support member.

12. The mobile device support system of claim 11, wherein the support member includes an opening, and wherein a cord of the wireless charger is adapted to extend through the opening.

13. The mobile device support system of claim 1, further comprising a charger mount adjustably connected to the support member and a wireless charger adapted to be connected to the charger mount.

14. A mobile device support system, comprising:
   a base;
   a support member for supporting a mobile device, wherein the support member is pivotably connected to the base, wherein the support member includes a plurality of first connectors and a plurality of second connectors;
   a plurality of arms removably connected to the support member, wherein each of the plurality of arms is connectable in a first position in which each of the plurality of arms is connected to one of the plurality of first connectors and a second position in which each of the plurality of arms is connected to one of the plurality of second connectors, wherein in the first position each of the plurality of arms is parallel to the support member, and wherein in the second position each of the plurality of arms is not parallel to the support member; and
   a wireless charger adapted to be connected to the support member.

15. The mobile device support system of claim 14, wherein each of the plurality of arms is comprised of an L-shaped member including an opening for engaging with one of the plurality of first connectors and a hook for engaging with one of the plurality of second connectors, and wherein the hook includes a ramped portion.

16. A mobile device support system, comprising:
   a base, wherein the base includes a clip;
   a support member for supporting a mobile device, wherein the support member is pivotably connected to the base, wherein the support member includes a plurality of first connectors and a plurality of second connectors, wherein each of the plurality of first connectors is comprised of a projection and wherein each of the plurality of second connectors is comprised of a slot, and wherein the support member includes an opening;
   a plurality of arms removably connected to the support member, wherein each of the plurality of arms is comprised of an L-shaped member including an opening for engaging with the projection of one of the plurality of first connectors and a hook for engaging with the slot of one of the plurality of second connectors, wherein the hook includes a ramped portion;
   a charger mount adjustably connected to the support member;
   a wireless charger adapted to be connected to the charger mount; and a cord connected to the wireless charger, wherein the cord is adapted to extend through the opening of the support member and underneath the clip of the base;

wherein each of the plurality of arms is connectable in a first position in which each of the plurality of arms is connected to one of the plurality of first connectors and a second position in which each of the plurality of arms is connected to one of the plurality of second connectors, wherein in the first position each of the plurality of arms is parallel to the support member, and wherein in the second position each of the plurality of arms is perpendicular to the support member;

wherein the support member is adjustable between a third position and a fourth position with respect to the base, wherein in the third position the support member is parallel with the base, and wherein in the fourth position the support member is not parallel with the base.

17. A mobile device support system, comprising:
a base;
a support member for supporting a mobile device, wherein the support member is pivotably connected to the base; and
a plurality of arms removably connected to the support member, wherein the plurality of arms are each connectable to the support member in a first position and a second position, wherein in the first position each of the plurality of arms is parallel to the support member, and wherein in the second position each of the plurality of arms is not parallel to the support member;
wherein the support member includes a plurality of first connectors and a plurality of second connectors, wherein each of the plurality of arms is adapted to be connected to one of the plurality of first connectors in the first position, and wherein each of the plurality of arms is adapted to be connected to one of the plurality of second connectors in the second position; and,
wherein each of the plurality of first connectors is comprised of a projection, and wherein each of the plurality of second connectors is comprised of an opening.

18. A mobile device support system, comprising:
a base;
a support member for supporting a mobile device, wherein the support member is pivotably connected to the base; and
a plurality of arms removably connected to the support member, wherein the plurality of arms are each connectable to the support member in a first position and a second position, wherein in the first position each of the plurality of arms is parallel to the support member, and wherein in the second position each of the plurality of arms is not parallel to the support member; and,
wherein the support member includes a plurality of first connectors and a plurality of second connectors, wherein each of the plurality of arms is adapted to be connected to one of the plurality of first connectors in the first position, wherein each of the plurality of arms is adapted to be connected to one of the plurality of second connectors in the second position, wherein the plurality of second connectors is comprised of a first pair of second connectors and a second pair of second connectors, and wherein the second pair of second connectors are spaced closer together than the first pair of second connectors.

19. A mobile device support system, comprising:
a base;
a support member for supporting a mobile device, wherein the support member is pivotably connected to the base; and
a plurality of arms removably connected to the support member, wherein the plurality of arms are each connectable to the support member in a first position and a second position, wherein in the first position each of the plurality of arms is parallel to the support member, and wherein in the second position each of the plurality of arms is not parallel to the support member;
wherein the support member includes a plurality of first connectors and a plurality of second connectors, wherein each of the plurality of arms is adapted to be connected to one of the plurality of first connectors in the first position, and wherein each of the plurality of arms is adapted to be connected to one of the plurality of second connectors in the second position; and,
wherein in the first position each of the plurality of arms is positioned on an upper half of the support member and wherein in the second position each of the plurality of arms is positioned on a lower half of the support member.

20. A mobile device support system, comprising:
a base;
a support member for supporting a mobile device, wherein the support member is pivotably connected to the base; and
a plurality of arms removably connected to the support member, wherein the plurality of arms are each connectable to the support member in a first position and a second position, wherein in the first position each of the plurality of arms is parallel to the support member, and wherein in the second position each of the plurality of arms is perpendicular to the support member.

21. A mobile device support system, comprising:
a base;
a support member for supporting a mobile device, wherein the support member is pivotably connected to the base; and
a plurality of arms removably connected to the support member, wherein the plurality of arms are each connectable to the support member in a first position and a second position, wherein in the first position each of the plurality of arms is parallel to the support member, wherein in the second position each of the plurality of arms is not parallel to the support member, and wherein each of the plurality of arms is comprised of an L-shaped member.

22. A mobile device support system, comprising:
a base;
a support member for supporting a mobile device, wherein the support member is pivotably connected to the base; and
a plurality of arms removably connected to the support member, wherein the plurality of arms are each connectable to the support member in a first position and a second position, wherein in the first position each of the plurality of arms is parallel to the support member, and wherein in the second position each of the plurality of arms is not parallel to the support member; and,
wherein the support member is adjustable between a third position and a fourth position with respect to the base.

23. The mobile device support system of claim 22, wherein in the third position the support member is parallel with the base, wherein in the fourth position the support member is not parallel with the base.

24. The mobile device support system of claim 23, wherein in the fourth position the support member is at between a 25 degree and a 90 degree angle with respect to the base.

25. A mobile device support system, comprising:
a base;
a support member for supporting a mobile device, wherein the support member is pivotably connected to the base;
a wireless charger adapted to be removably connected to the support member; and
a plurality of arms removably connected to the support member, wherein the plurality of arms are each connectable to the support member in a first position and a second position, wherein in the first position each of the plurality of arms is parallel to the support member, and wherein in the second position each of the plurality of arms is not parallel to the support member.

26. A mobile device support system, comprising:
a base;
a support member for supporting a mobile device, wherein the support member is pivotably connected to the base;
a charger mount adjustably connected to the support member;
a wireless charger adapted to be connected to the charger mount; and
a plurality of arms removably connected to the support member, wherein the plurality of arms are each connectable to the support member in a first position and a second position, wherein in the first position each of the plurality of arms is parallel to the support member, and wherein in the second position each of the plurality of arms is not parallel to the support member.

* * * * *